(12) United States Patent
Tamaoki

(10) Patent No.: US 8,451,341 B2
(45) Date of Patent: May 28, 2013

(54) IMAGE CAPTURE DEVICE, IMAGE CAPTURE APPARATUS, SIGNAL PROCESSING METHOD, AND PROGRAM

(75) Inventor: Akihiro Tamaoki, Tokyo (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 12/841,235

(22) Filed: Jul. 22, 2010

(65) Prior Publication Data

US 2011/0025874 A1  Feb. 3, 2011

(30) Foreign Application Priority Data

Jul. 28, 2009  (JP) ................ P2009-175710

(51) Int. Cl.
*H04N 5/228* (2006.01)
(52) U.S. Cl.
USPC ................................... 348/222.1
(58) Field of Classification Search
USPC .................................... 348/222.1
See application file for complete search history.

(56) References Cited

U.S. PATENT DOCUMENTS

| 6,507,365 B1* | 1/2003 | Nakamura et al. ............ 348/296 |
| 2004/0246858 A1* | 12/2004 | Saigusa et al. ............. 369/53.31 |
| 2005/0140795 A1* | 6/2005 | Hisamatsu et al. ........ 348/222.1 |

FOREIGN PATENT DOCUMENTS

| JP | 2007 235889 | 9/2007 |
| JP | 2007 243637 | 9/2007 |
| JP | 2008 206003 | 9/2008 |

* cited by examiner

*Primary Examiner* — James Hannett
(74) *Attorney, Agent, or Firm* — Frommer Lawrence & Haug LLP; William S. Frommer

(57) ABSTRACT

An image capture device includes: a digital processing unit that performs predetermined processing on pixel data containing first, second, and third digital signals obtained from pixel units having a valid pixel area for generating the first digital signals through photoelectrical conversion of incident image light, an optical black pixel area for generating the second digital signals, and a dummy pixel area for generating the third digital signals; an adding unit that adds the second-and-third-digital-signal-containing pixel data or the third-digital-signal-containing pixel data a predetermined number of times; a dividing unit that divides the added pixel data by the predetermined number of times, to determine an average value of levels of the digital signals; a delay unit that delays output of the first-to-third-digital-signal-containing pixel data by a predetermined amount of time; and a multiplexer that selects and outputs the first-to-third-digital-signal-containing pixel data or pixel data having the average value.

12 Claims, 18 Drawing Sheets

IMAGE CAPTURE DEVICE, IMAGE CAPTURE APPARATUS, SIGNAL PROCESSING METHOD, AND PROGRAM

BACKGROUND OF THE INVENTION

1. Field of the Invention

The present invention relates to an image capture device, an image capture apparatus, a signal processing method, and a program which are preferably applied to, for example, a case in which noise components superimposed on output signals of the image capture device are eliminated.

2. Description of the Related Art

Various technologies have been proposed in order to correct noise components (particularly, dark current noise or low-frequency fixed-pattern noise in columns and lines) superimposed on image signals output from a solid-state image capture device. One example of a technology for noise correction using optical black pixels (hereinafter may be referred to as "OB pixels") or dummy pixels for outputting pseudo image signals generated by only analog-to-digital conversion regardless of the presence/absence of pixels. Image signals output from those pixels are read pixel by pixel in the same manner as valid pixels for generating analog image signals (which, together with digital image signal described below, may hereinafter be referred to as "image signals") when image light of a subject is incident. A signal processing device for processing image signals output from the solid-state image capture device determines an average value of signal levels of the image signals for each area, such as a column, a line, or an entire surface of an OB pixel area, and performs noise correction using the average value as a noise correction value.

Since the noise correction value used is merely the average value, no special processing has been performed in order to transfer image signals output from the OB pixels or dummy pixels.

In recent years, however, since the number of pixels processed by each image capture apparatus has increased and the frame rate also has increased, the band of transferring image signals has become higher. Thus, when the transfer band of the image signals is increased with the signal processing device having a typical configuration as described above, the power consumption increases.

An example of the configuration of an image capture apparatus 100 of related art will now be described.

FIG. 16 is a block diagram showing an example of the internal configuration of the image capture apparatus 100 of related art.

The image capture apparatus 100 includes a solid-state image capture device 101 and a signal processing device 105. The solid-state image capture device 101 outputs digital image signals and the signal processing device 105 receives the digital image signals from the solid-state image capture device 101 and performs predetermined correction processing on the digital image signals.

The solid-state image capture device 101 includes pixel units 102 for outputting analog image signals obtained from subject image light that is incident via a lens (not shown). The solid-state image capture device 101 further includes an analog-to-digital converting unit (A/D) 103 for converting the analog image signals, received from the pixel units 102, into digital image signals and a digital processing unit 104 for performing predetermined processing on the digital image signals.

The signal processing device 105 has a noise correcting unit 106 for correcting noise superimposed on the digital image signals. The noise correcting unit 106 includes a delay unit 107 and an average-value determining unit 110. The delay unit 107 delays output of the digital image signals, input from the solid-state image capture device 101, by a predetermined amount of time and the average-value determining unit 110 determines an average value of the levels of the digital image signals per unit time. The noise correcting unit 106 further includes a correcting unit 108 for performing predetermined correction on the digital image signals input from the delay unit 107 and the average-value determining unit 110.

The average-value determining unit 110 includes an adding unit 111 for adding the signal levels of the digital image signals, output from the solid-state image capture device 101, a predetermined number of times and a counter 112 for measuring the number of times the addition is performed by the adding unit 111. The average-value determining unit 110 further includes a dividing unit 113 for dividing the digital-image-signal signal level, added by the adding unit 111, by the number of additions measured by the counter 112. An output of the dividing unit 113 is input from the average-value determining unit 110 to the correcting unit 108. The correcting unit 108 then performs noise correction on the digital image signals by subtracting the average value, input from the average-value determining unit 110, from the digital image signals input from the delay unit 107.

FIG. 17 illustrates one example of pixel areas of the solid-state image capture device 101.

The number of pixel units 102 and the number of analog-to-digital converting units 103 in the solid-state image capture device 101 correspond to 2160×1160 words, more specifically, 2160 words in a horizontal direction and 1160 words in a vertical direction. A valid pixel area 121 is provided to output analog image signals in response to incident image light. An optical black (OB) pixel area 122 is provided in a light-shielding area around the valid pixel area 121. Since no image light is incident on the OB pixel area 122, the OB pixel area 122 outputs analog image signals regardless of image light. The image signals output from the pixel units 102 provided in the OB pixel area 122 are used to eliminate noise components and so on superimposed on the image signals output from the valid pixel area 121.

A dummy pixel area 123 is provided around the OB pixel area 122 to output pseudo analog image signals. The dummy pixel area 123 has no pixel units 102 and has only the analog-to-digital converting units 103, and is thus used to detect analog characteristics other than those of the pixels. For example, for a column A/D structure, the dummy pixel area 123 has analog-to-digital converting units 103 corresponding to the number of pixels in one line. Thus, the dummy pixel area 123 physically has the analog-to-digital converting units 103, the number thereof corresponding to the number of pixels (i.e., 40 pixels), at each of the left and right sides of the valid pixel area 121, so that image signals are read from the dummy pixel area 121 as in the valid pixel area 121 having pixels. The pixels located at each of the upper and lower sides of the valid-pixel area are 121 isolated and mage signals corresponding to 40 lines at each of the upper and lower sides are repeatedly read. This reading corresponds to reading image signals from the dummy pixels corresponding to 40 pixels from the upper, lower, left, and right pixel areas.

The pixel areas shown in FIG. 17 represent a transfer scheme of the image signals, not a physical pixel arrangement. More specifically, FIG. 17 shows a transfer scheme for a case in which the valid pixel area 121 occupies an area of 2000×1000 words and the OB pixel area 122 occupies an area of 40 words at each of the upper, lower, left, and right sides of the valid pixel area 121. In addition, the dummy pixel area 123 corresponding to 40 words is physically provided at each of the left and right sides and no dummy pixel area is provided in each of the upper and lower sides of the valid pixel area 121. In the transfer scheme, however, image signals corresponding to 40 words are read from each of the upper, lower, left, and right sides of the dummy pixel area 123. With this arrangement, the solid-state image capture device 101 in the related art transfers pixel data containing analog image signals corresponding to 2,505,600 (=2160×1160) words to the signal processing device 105 for each horizontal line (i.e., for each set of 2,160 words).

When attention is given to an image output for each line in the vertical direction, the image output can be expressed in the following manner.

For simplicity of representation, the number of words of image signals output from each pixel area is expressed by a combination of the name of the pixel area and the number of words.

1 to 40 lines: dummy 2160 words 41 to 80 lines: dummy 40 words, OPB 2080 words, and dummy 40 words 81 to 1080 lines: dummy 40 words, OPB 40 words, valid 200 words, OPB 40 words, and dummy 40 words 1081 to 1120 lines: dummy 40 words, OPB 2080 words, and dummy 40 words 1121 to 1160 lines: dummy 2160 words Although a description below is given in conjunction with an example of correcting image signals output for each line, correction of image signals output for each column is also performed. Correction for each column uses data for each column.

FIG. 18 illustrates an example of noise detection and correction processing on the pixel data, the noise detection and the correction processing being performed by the image capture apparatus 100 in the related art through use of the dummy pixels.

Now, a description will be given with reference to the enlarged view of an area 124 (shown in FIG. 17) in the solid-state image capture device 101.

A horizontal line 125 includes analog image signals output from the valid pixel area 121, the OB pixel area 122, and the dummy pixel area 123.

The adding unit 111 included in the signal processing device 105 adds digital image signals, output from the dummy pixel area 123 and converted, a predetermined number of times. Using the number of additions measured by the counter 112, the dividing unit 113 determines an average value by dividing the result of the addition. The correcting unit 108 then performs noise correction on the digital image signals obtained by converting analog image signals output from the valid pixel area 121 on the same horizontal line, by performing processing, such as subtracting the average value.

FIG. 19 illustrates an example of a scheme for transferring, in one horizontal line 125, pixel data contained in the pixel data output from the solid-state image capture device 101.

The horizontal line 125 for the image signals output from the solid-state image capture device 101 to the signal processing device 105 has a structure as described below. The pixel data containing the analog image signals output from one pixel unit 102 included in the horizontal line 125 has a data width of 12 bits, and is represented by u10.2. Thus, the analog image signals output from the dummy pixel area 123 and the analog image signals output from the pixel units 102 included in the OB pixel area 122 and the value-pixel area 121 are represented by u10.2 for each pixel. In this case, in the representation "u10.2", "u" means "unsigned" and "10.2" means that the integer portion is 10 bits and the fractional portion is 2 bits. This representation is used in the description below.

As illustrated in FIG. 19, the horizontal line 125 includes analog image signals output from the 40-word dummy pixel area 123, the 40-word OB pixel area 122, and the 2000-word valid-pixel area 121. In the illustration in FIG. 19, however, attention is given to only the area 124. In practice, the horizontal line 125 further includes pixel data output from the 40-word OB pixel area 122 and the 40-word dummy pixel area 123 located at the right side of the valid pixel area 121.

Japanese Unexamined Patent Application Publication No. 2007-235889 discloses a technology for performing data correction by using data read from an optical black section and a dummy pixel section.

Japanese Unexamined Patent Application Publication No. 2007-243637 discloses a technology in which a reference signal that acts as a reference for clamping is controlled in accordance with sensitivity setting to thereby reduce the amount of color phase shift and so on found in a low-luminance portion and caused by noise clipping.

Japanese Unexamined Patent Application Publication No. 2008-206003 discloses a technology in which the values of dummy pixels are subtracted from the values of valid pixels to thereby eliminate an influence of power-source noise and so on.

SUMMARY OF THE INVENTION

Since the solid-state image capture device 101 in the related art transfers pixel data (each frame therein has 640× 480 words) at a rate of, at most, 30 frames per second, there is enough time to transfer image signals from the solid-state image capture device 101 to the signal processing device 105. However, in recent years, for example, it is generally necessary to transfer the amount of data for 60 frames, each frame having 1920×1080 words, per second, the transfer bands used are increasing significantly. Since the increase in the transfer bands can become a factor for, for example, an increase in the power consumption, there is an increasing necessity for reducing the transfer bands as much as possible. It takes time for one horizontal line to transfer image signals for all pixels, the image signals being output from the valid pixel area 121, the OB pixel area 122, and the dummy pixel area 123. Thus, it has been difficult to increase the frame rate at which the pixel data is transferred from the solid-state image capture device 101 to the signal processing device 105.

OB pixels often have pixel defects that occur at certain locations and impulse noise that occurs at uncertain locations (hereinafter, the pixel defects and the impulse noise are collectively referred to as a "failure"). A pixel having a pixel failure outputs image signals having an extraordinary signal level. For example, even when a subject having a black surface is photographed, extraordinary outputting occurs, for example, only a portion having a pixel failure looks as a white dot. In this case, processing for correcting the signal levels of digital image signals output from the pixel having the pixel failure is performed, rather than correcting the physical pixel. However, when the digital image signals are simply added, the resulting added data contains a failure, because of an influence of the image signal having the extraordinary signal level. Even if a correction value is determined from such added data to correct the pixel data, the corrected pixel data has an erroneous value to cause deterioration of the image quality of an image displayed using digital image signals contained in the corrected pixel data. When added data is generated even once, it is difficult to determine which part of the added data is affected by image signals output from the pixel having the pixel failure.

In addition, in order to provide a high-quality image, the accuracy of bits after the decimal point has to be enhanced to correct noise components superimposed on the digital image signals. This processing involves addition of a larger amount of digital image signals. However, when pixel data obtained by addition as in the technology disclosed in Japanese Unexamined Patent Application Publication No. 2007-235889 is restricted to have a word length corresponding to one pixel, the number of additions can be allowed to the extent that the word length corresponding to one pixel is not exceeded. In such a case, noise correction can be performed with only low accuracy, which may cause deterioration of the image quality in many cases.

In view of such a situation, it is desirable to reduce the transfer bands of data output from an image capture device.

Pixel units according to an embodiment of the present invention has a valid pixel area for generating first digital signals through photoelectrical conversion of incident image light, an optical black pixel area for generating second digital signals, and a dummy pixel area for generating third digital signals. The optical black pixel area is provided in a light shielding area around the valid pixel area and the dummy pixel area is provided around the optical black pixel area. Predetermined processing is performed on pixel data containing the first to third digital signals obtained from the pixel units, and the processed second-and-third-digital-signal-containing pixel data or third-digital-signal-containing pixel data is added a predetermined number of times. Pixel data having an average value obtained by dividing the added third-digital-signal-containing pixel data by the predetermined number of times is output to a multiplexer, so that output of the processed first-to-third-digital-signal-containing pixel data is delayed by a predetermined amount of time. The processed first-to-third-digital-signal-containing pixel data or the pixel data having the average value is selected and output.

With this arrangement, it is possible to reduce the time taken for the pixel units to output the pixel data.

According to the present invention, either the second and third digital signals or the third digital signals are added a predetermined number of times. The added digital signals are divided by the number of additions to determine an average value of the signal levels of the digital signals, and the average value is output. This arrangement can reduce the amount of pixel data output from the pixel units and can reduce the transfer bands. As a result, there is an advantage in that the power consumption of the image capture device and the image capture apparatus can be reduced.

DESCRIPTION OF THE PREFERRED EMBODIMENTS

Best modes (hereinafter referred to as "embodiments") for carrying out the present invention will be described below. A description below is given in the following sequence:
1. First Embodiment (Example in which Pixel Data Containing Added Data of Dummy Pixels is Transferred)
2. Second Embodiment (Example in which Pixel Data Obtained by Dividing Added Data of Dummy Pixels into MSB and LSB is Transferred)
3. Third Embodiment (Example in which Pixel Data Having Average Value of Dummy Pixels is Transferred)

4. Fourth Embodiment (Example in which Pixel Data Having Average Value of Dummy Pixels and Failure-Corrected Average Value of OB Pixels are Transferred)
5. Modification First Embodiment Example in which Pixel Data Containing Added Data of Dummy Pixels is Transferred A first embodiment of the present invention will be described below with reference to FIGS. 1 and 5. A description in the present embodiment will be given of an example in which the present invention is applied to an image capture apparatus 1 for reading image signals for each horizontal line and performing predetermined processing on the read image signals. A series of processing performed by processing blocks described below can be used for a method for processing image signals.

Figure 1:
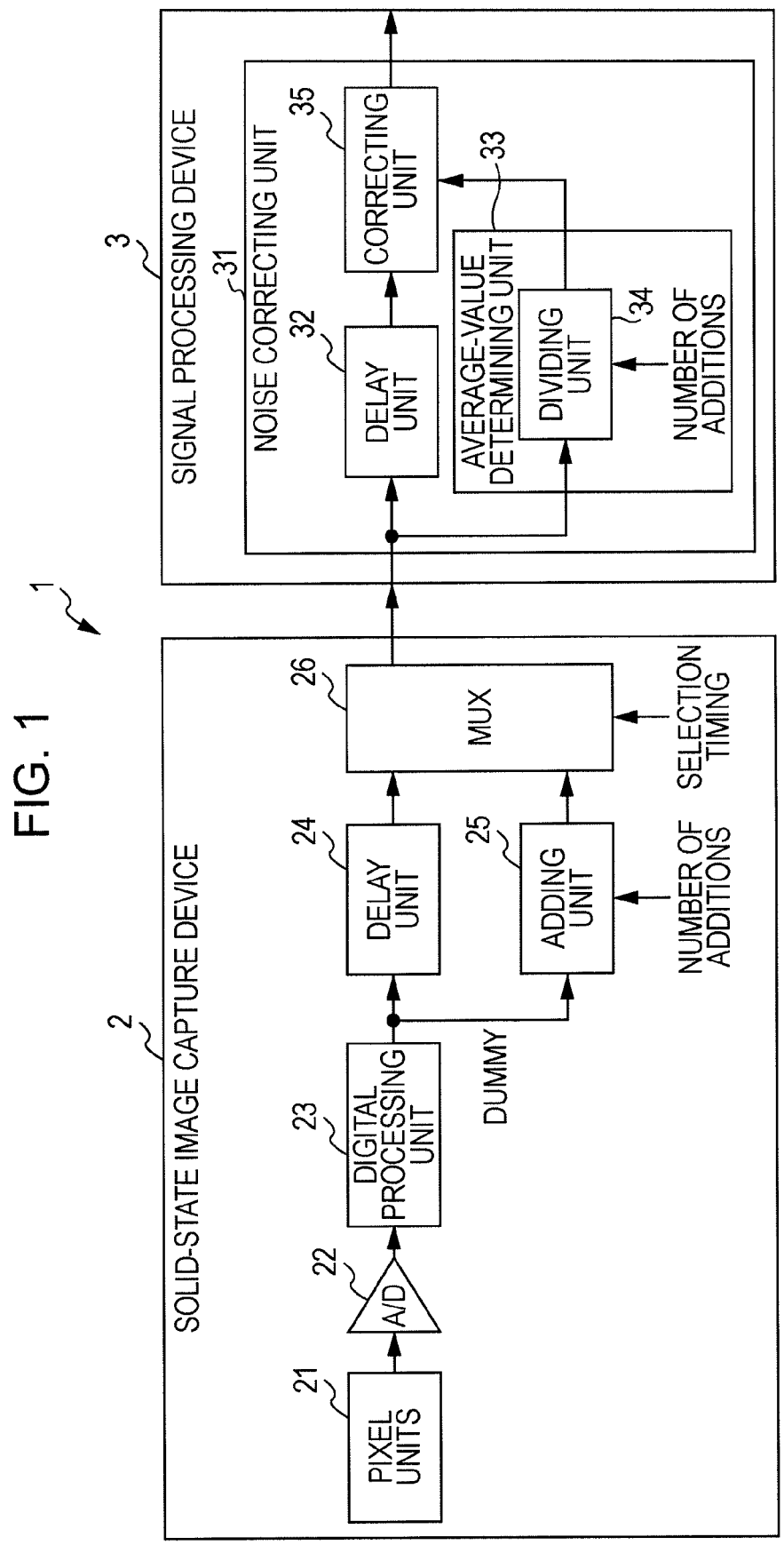
FIG. 1 is a block diagram showing an example of the internal configuration of an image capture apparatus according to a first embodiment of the present invention.

FIG. 1 is a block diagram showing an example of the internal configuration of the image capture apparatus 1 according to the present embodiment.

The image capture apparatus 1 includes a solid-state image capture device 2 and a signal processing device 3. The solid-state image capture device 2 outputs digital image signals and the signal processing device 3 receives the digital image signals from the solid-state image capture device 2 and performs predetermined correction processing on the digital image signals.

The solid-state image capture device 2 includes pixel units 21 for outputting analog image signals obtained from subject image light that is incident via a lens (not shown). The solid-state image capture device 2 further includes an analog-to-digital converting unit 22 for converting the analog image signals, received from the pixel units 21, into digital image signals and a digital processing unit 23 for performing predetermined digital processing on the digital image signals.

The solid-state image capture device 2 further includes a delay unit 24 for delaying output of first, second, and third digital signals (described below), input from the digital processing unit 23, by a predetermined amount of time. The solid-state image capture device 2 further includes an adding unit 25 for adding the digital image signals a number of times (which is a predetermined parameter) and a multiplexer (MUX) 26 for selecting the digital image signals, input from the delay unit 24 or the adding unit 25, at a predetermined selection timing.

The digital processing unit 23 performs digital processing, such as offset addition processing, on the digital image signals. The adding unit 25 adds pixel data containing the second and third digital signals processed by the digital processing unit 23 or pixel data containing the third digital signals the predetermined number of times.

The multiplexer 26 selects pixel data containing the first to third digital signals processed by the digital processing unit 23 or the third-digital-signal-containing pixel data added by the adding unit 25 and outputs the selected pixel data. Consequently, the digital image signals selected by the multiplexer 26 are transferred from the solid-state image capture device 2 to the signal processing device 3.

The signal processing device 3 has a noise correcting unit 31 for correcting noise superimposed on the digital image signals. The noise correcting unit 31 includes a delay unit 32 for delaying output of the digital imager signals, input from the solid-state image capture device 2, by a predetermined amount of time. The noise correcting unit 31 further includes an average-value determining unit 33 for determining an average value of levels of the digital image signals per unit time.

The delay unit 32 delays output of the first-to-third-digital-signal-containing pixel data, received from the solid-state image capture device 2, by a predetermined amount of time.

The average-value determining unit 33 determines an average value of the levels of the third-digital-signal-containing pixel data by dividing the added third-digital-signal-containing pixel data, received from the solid-state image capture device 2, by the number of additions. Thus, the average-value determining unit 33 includes a dividing unit 34 for dividing the digital image signals input from the solid-state image capture device 2, on the basis of the number of additions predetermined as a parameter. The noise correcting unit 31 includes a correcting unit 35 for correcting the levels of the first-to-third-digital-signal-containing pixel data, output from the delay unit 32, by subtracting the average value from the levels of the first-to-third-digital-signal-containing pixel data.

Figure 17:
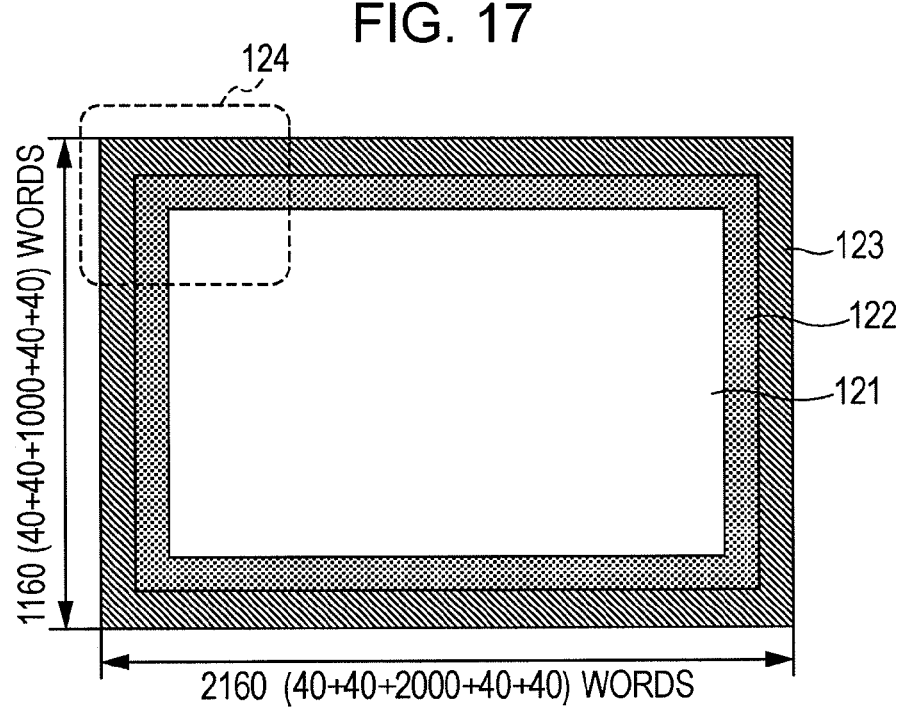
FIG. 17 is a diagram illustrating an example of pixel areas of a solid-state image capture device in the related art.
Figure 18:
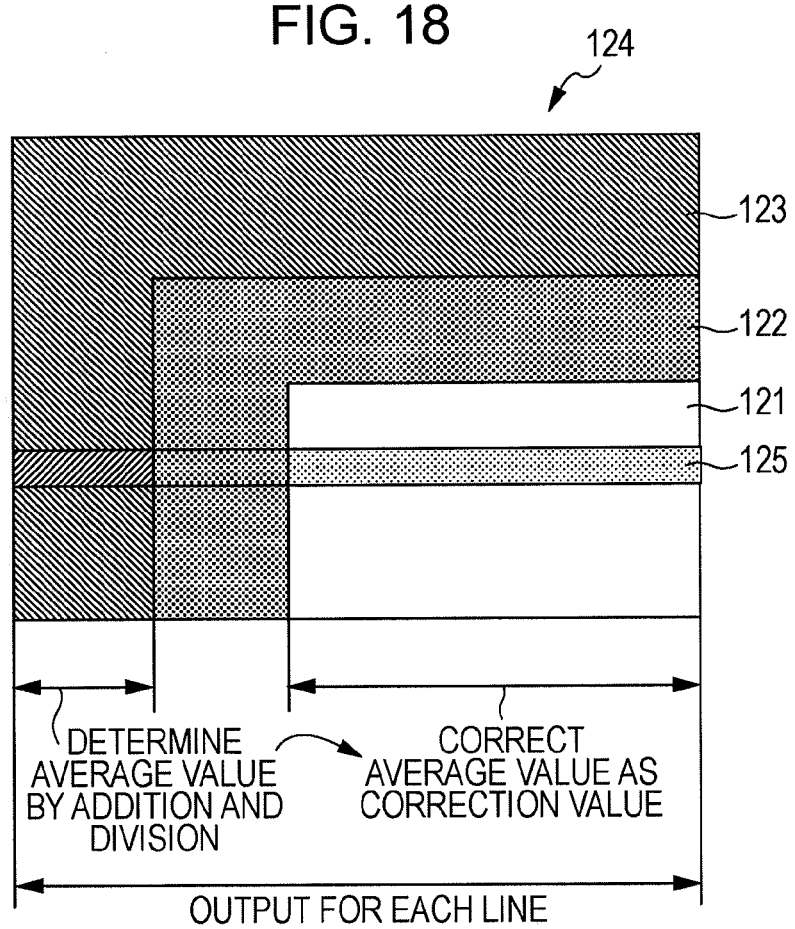
FIG. 18 is a diagram illustrating an example of noise detection of pixel data and correction processing of digital image signals, the noise detection and the correction processing being performed by the image capture apparatus of the related art.
Figure 19:
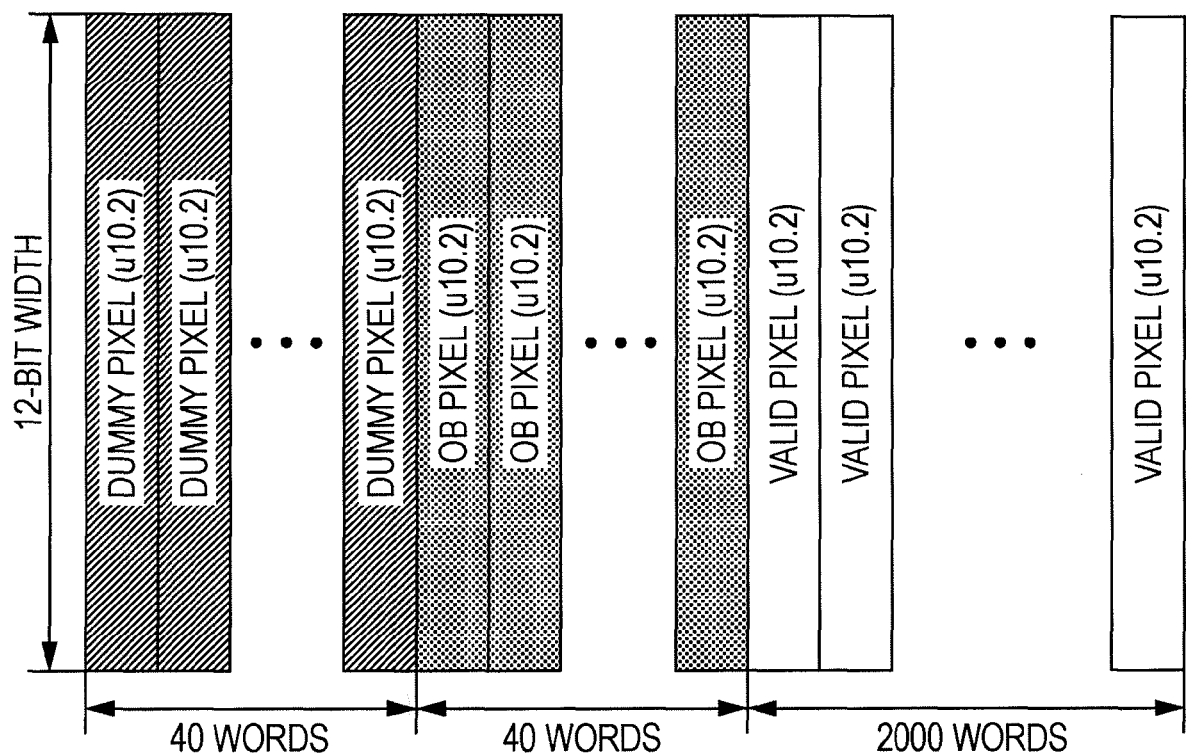
FIG. 19 illustrates an example of a scheme for transferring, in a horizontal line, pixel data output from the solid-state image capture device in the related art.

The delay unit 24 and the multiplexer 26 in the present embodiment are used to adjust the phase of unprocessed pixel data output from the digital processing unit 23 to the phase of the pixel data added by the adding unit 25. The delay unit 24 and the multiplexer 26 are used to covert an output format (shown in FIG. 17) of the solid-state image capture device 101 in the related art into an output format (described below and shown in FIG. 2) of the solid-state image capture device 2 in the present embodiment.

Figure 2:
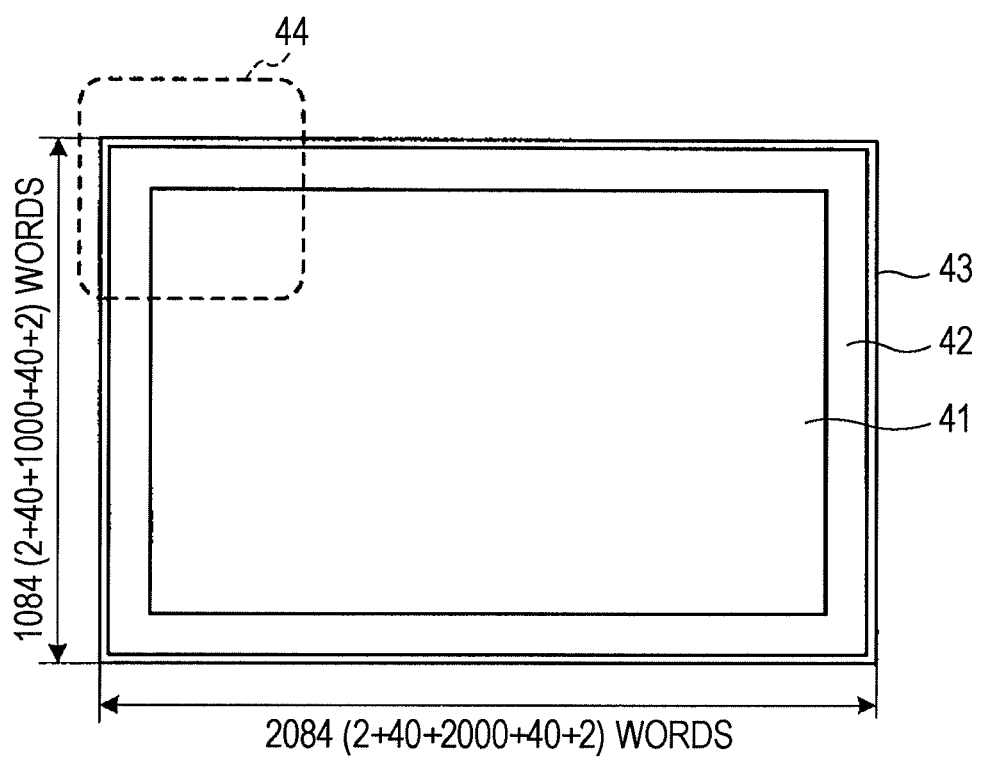
FIG. 2 is a diagram illustrating an example of pixel areas of a solid-state image capture device in the first embodiment of the present invention.

FIG. 2 illustrates one example of pixel areas of the solid-state image capture device 2.

The number of pixel units 21 in the solid-state image capture device 2 corresponds to 2084×1084 words, more specifically, 2084 words in a horizontal direction and 1084 words in a vertical direction. A valid pixel area 41 is provided to photoelectrically convert incident image light and output resulting analog image signals. An OB (optical black) pixel area 42 is provided in a light-shielding area around the valid pixel area 41. Since no image light is incident on the OB pixel area 42, the OB pixel area 42 outputs analog image signals regardless of image light. The image signals output from the pixel units 21 provided in the OB pixel area 42 are used to eliminate noise components and so on superimposed on the image signals output from the valid pixel area 41.

A dummy pixel area 43 is provided around the OB pixel area 42 to output pseudo analog image signals. The dummy pixel area 43, however, is a virtual area determined as a result of computation performed by the solid-state image capture device 2.

By using the digital image signals subjected to the predetermined processing performed by the analog-to-digital converting unit 22 and the digital processing unit 23, the image capture apparatus 1 according to the present embodiment corrects the digital image signals obtained from the valid pixel area 41. The digital image signals generated from the analog image signals output from the valid pixel area 41 may hereinafter be referred to as "first digital signals". Similarly, the digital image signals generated from the analog image signals output from the OB pixel area 42 may be referred to as "second digital signals" and the digital image signals generated from the image signals output from the dummy pixel area 43 may be referred to as "third digital signals".

In FIG. 2, the valid pixel area 41 occupies an area of 2000×1000 words and the OB pixel area 42 occupies an area of 40 words at each of the upper, lower, left, and right sides of the valid pixel area 41. The dummy pixel area 43 occupies an area of two words at each of the upper, lower, left, and right sides of the OB pixel area 42.

With this arrangement, the solid-state image capture device 2 transfers pixel data for 2,259,056 (=2084×1084) words to the signal processing device 3 for each horizontal line.

The above-described solid-state image capture device 101 in the related art uses the amount of pixel data for 2,505,600 words to transfer pixel data for all pixels. However, the solid-state image capture device 2 in the present embodiment can achieve the pixel data transfer with the amount of pixel data corresponding to 2,259,056 pixels. Accordingly, a transfer band for transferring the pixel data from the solid-state image capture device 2 to the signal processing device 3 can be reduced by about 10%.

Figure 3:
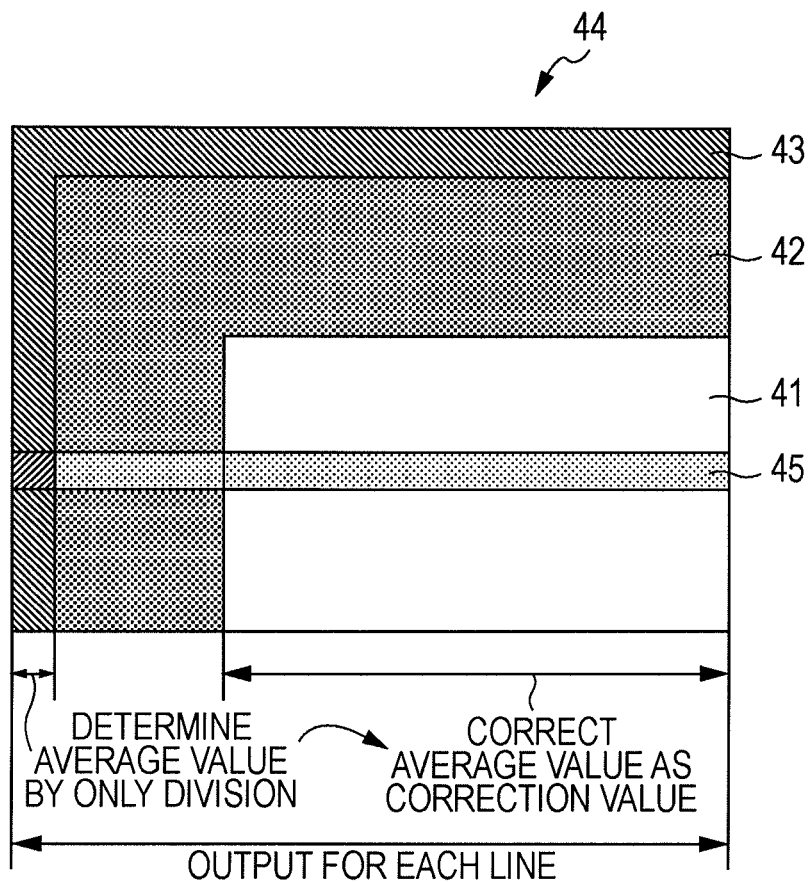
FIG. 3 is a diagram illustrating an example of noise detection of pixel data and correction processing of digital image signals, the noise detection and the correction processing being performed by the image capture apparatus according to the first embodiment of the present invention.

FIG. 3 illustrates an example of noise detection and correction processing on the pixel data of the digital image signals, the noise detection and the correction processing being performed by the solid-state image capture device 2.

A description will be given with reference to the enlarged view of an area 44 (shown in FIG. 2) in the solid-state image capture device 2.

A horizontal line 45 includes image signals output from the valid pixel area 41, the OB pixel area 42, and the dummy pixel area 43.

The signal processing device 3 determines an average value of the signals levels on the basis of the digital image signals obtained from the image signals output from the dummy pixel area 43. The average value is used as a correction value for the digital image signals, obtained from the valid pixel area 41, to correct the signal levels.

Figure 4:
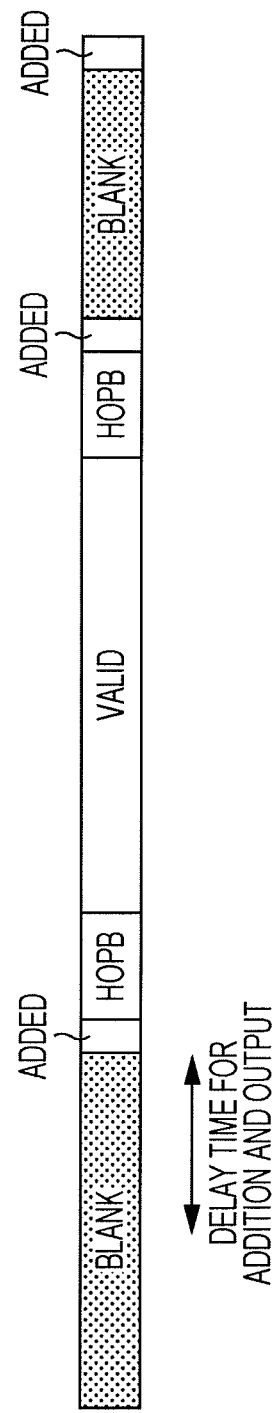
FIGS. 4A to 4C illustrate examples of the format of pixel data output from the solid-state image capture device in the first embodiment of the present invention.

FIGS. 4A to 4C show examples of the formats of pixel data.

FIG. 4A illustrates an example of the format of the pixel data output from the pixel units 21.

Pixel data, one unit of which includes a blank field, a dummy field, an HOPB (Horizontal Optical Black) field, a valid field, an HOPB field, and a dummy field, is output from the pixel units 21. The dummy field stores the pixel data containing the digital image signals obtained from the dummy pixel area 43. The HOPB field stores the pixel data containing the digital image signals obtained from the OB pixel area 42. The valid field stores the pixel data containing the digital image signals obtained from the valid pixel area 41.

FIG. 4B illustrates an example of the format of pixel data output from the solid-state image capture device 101 in the related art.

According to the solid-state image capture device 101 in the related art, after it outputs the pixel data as the digital image signals without correction, the signal processing device 105 performs noise correction. Thus, the timing at which the pixel data is transferred from the solid-state image capture device 101 to the signal processing device 105 is delayed relative to the timing at which the pixel data is output from the pixel units 102, because of the processing performed by the analog-to-digital converting unit 103 and the digital processing unit 104.

FIG. 4C illustrates an example of the format of the pixel data output from the solid-state image capture device 2 in the present embodiment.

The multiplexer 26 performs pixel-data substitution processing on a field storing the third-digital-signal-containing pixel data included in the pixel data output from the pixel unit 21 to the digital processing unit 23. That is, the multiplexer 26 substitutes the second-and-third-digital-signal-containing pixel data or third-digital-signal-containing pixel data added by the adding unit 25 and outputs the resulting pixel data with a delay corresponding to the predetermined amount of time.

The adding unit 25 in the solid-state image capture device 2 adds the digital image signals obtained from the dummy pixel area 43. Added data obtained from the addition has a length of two words. Thus, the dummy field is replaced with a field storing the added data. The delay time to be considered in order for the adding unit 25 to add the pixel data and output the resulting pixel data is adjusted by the blank field provided before the field storing the added data. Thus, the amount of pixel data output from the solid-state image capture device 2 is reduced compared to the amount of pixel data output from the solid-state image capture device 101 in the related art.

A technology for replacing the pixel data output from the dummy pixel area 43 in the present embodiment with the pixel data output from the OB pixel area 42 is disclosed in Japanese Unexamined Patent Application Publication No. 2007-235889. However, when the OB pixels include a defective pixel, merely adding the pixel data output from the OB pixels results in erroneous correction. Accordingly, the solid-state image capture device 2 in the present embodiment adds only the pixel data output from the dummy pixel area 43. Thus, the amount of time for transferring the pixel data from the solid-state image capture device 2 to the signal processing device 3 can be reduced by about 10%, compared to the amount of transfer time in the related art.

Figure 5:
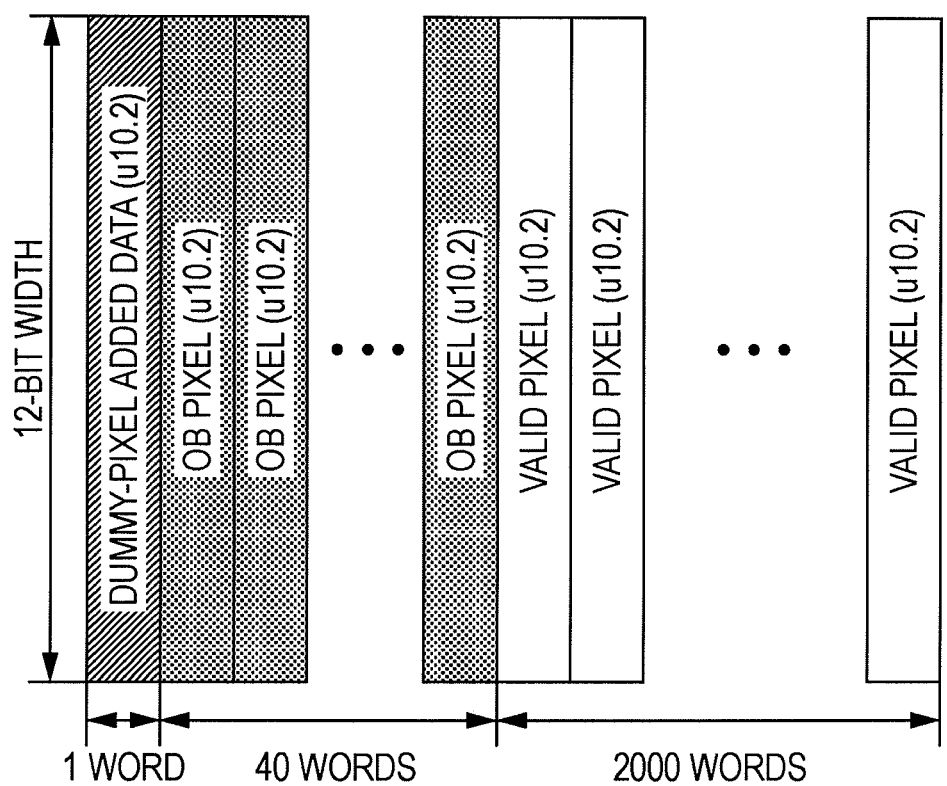
FIG. 5 illustrates an example of a scheme for transferring, in a horizontal line, pixel data output from the solid-state image capture device in the first embodiment of the present invention.

FIG. 5 illustrates an example of a scheme for transferring, in one horizontal line 45, pixel data output from the solid-state image capture device 2.

The horizontal line 45 for the image signals output from the solid-state image capture device 2 to the signal processing device 3 has a structure as described below. The pixel data output from one pixel unit 21 included in the horizontal line 45 has a data width of 12 bits. The horizontal line 45 includes the added data obtained from the pixel data output from the two-word dummy pixel area 43, the pixel data output from the 40-word OB pixel area 42, and the pixel data output from the 2000-word valid pixel area 41. In the illustration in FIG. 5, however, attention is given to only the area 44. In practice, the horizontal line 45 further includes the pixel data containing the digital image signals obtained from the 40-word OB pixel area 42 and the added data obtained from the pixel data output from the two-word dummy pixel area 43, the 40-word OB pixel area 42 and the two-word dummy pixel area 43 being located at the right side of the valid pixel area 41.

According to the image capture apparatus 1 of the first embodiment described above, the solid-state image capture device 2 generates the added data by adding two-word pixel data output from the dummy pixel area 43. Consequently, the amount of pixel data output from the solid-state image capture device 2 to the signal processing device 3 is reduced, thus offering an advantage in that a band of a communication line for transferring data from the solid-state image capture device 2 to the signal processing device 3 is not suppressed. In addition, since the image signals output from the dummy pixel area 43 are added for output, it is possible to provide a high-quality image while reducing the band in which the pixel data is transferred. Additionally, since the adding unit 25 in the solid-state image capture device 2 performs processing for adding the pixel data, it is not necessary for the signal processing device 3 to perform processing for adding the pixel data. Thus, when the signal processing device 3 performs noise correction on the digital image signals, it is possible to quickly determine the average value of the digital signals. Thus, there is an advantage of being able to increase a computation speed for the noise correction.

The processing blocks subsequent to the digital processing unit 23 may be provided outside the solid-state image capture device 2.

Figure 6:
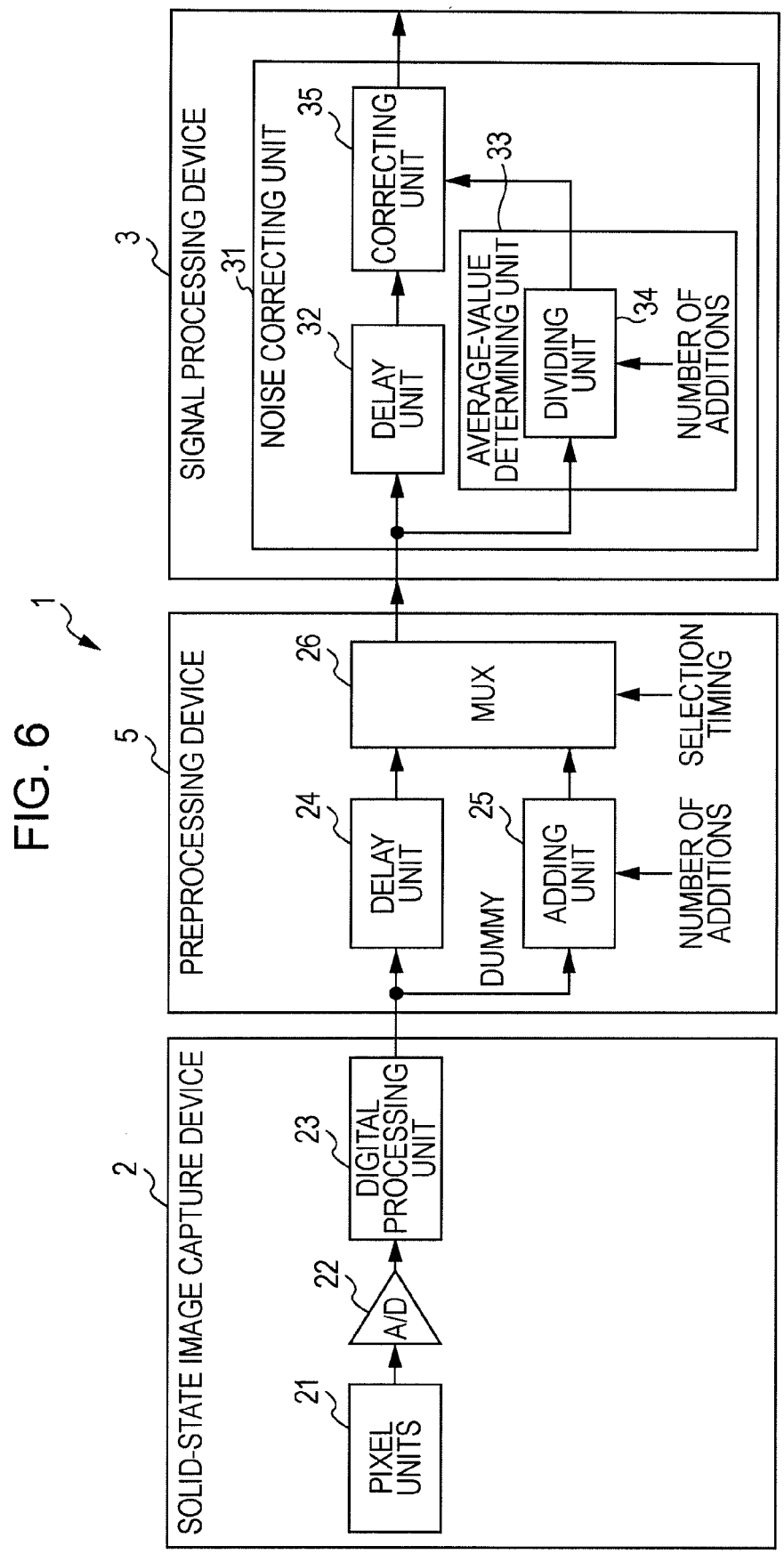
FIG. 6 is a block diagram showing another example of the internal configuration of the image capture apparatus according to the first embodiment of the present invention.

FIG. 6 shows another example of the configuration of the image capture apparatus 1 according to the first embodiment illustrated in FIG. 1.

In this example, a preprocessing device 5 is provided between the solid-state image capture device 2 and the signal processing device 3. The preprocessing device 5 includes the delay unit 24, the adding unit 25, and the multiplexer 26. This arrangement offers advantages in that the processing load of the solid-state image capture device 2 is reduced and the power consumption can be reduced. In this example, some of the functional blocks in the solid-state image capture device 2 are incorporated into the preprocessing device 5. Thus, through provision of only the preprocessing device 5 while using a typical solid-state image capture device, it is possible to perform signal processing that is similar to that of the image capture apparatus 1 according to the first embodiment described above.

Second Embodiment

Example in which Pixel Data Obtained by Dividing Added Data of Dummy Pixels into MSB and LSB is Transferred A second embodiment according to the present invention will be described next.

The second embodiment is directed to an image capture apparatus 50 in which a solid-state image capture device 51 converts the data type of the digital image signals and then outputs digital image signals having the converted data type to a signal processing device 55. In the description below, units corresponding to those described above in the first embodiment and illustrated in FIG. 1 are denoted by the same reference numerals and detailed descriptions thereof are not given hereinafter.

Figure 7:
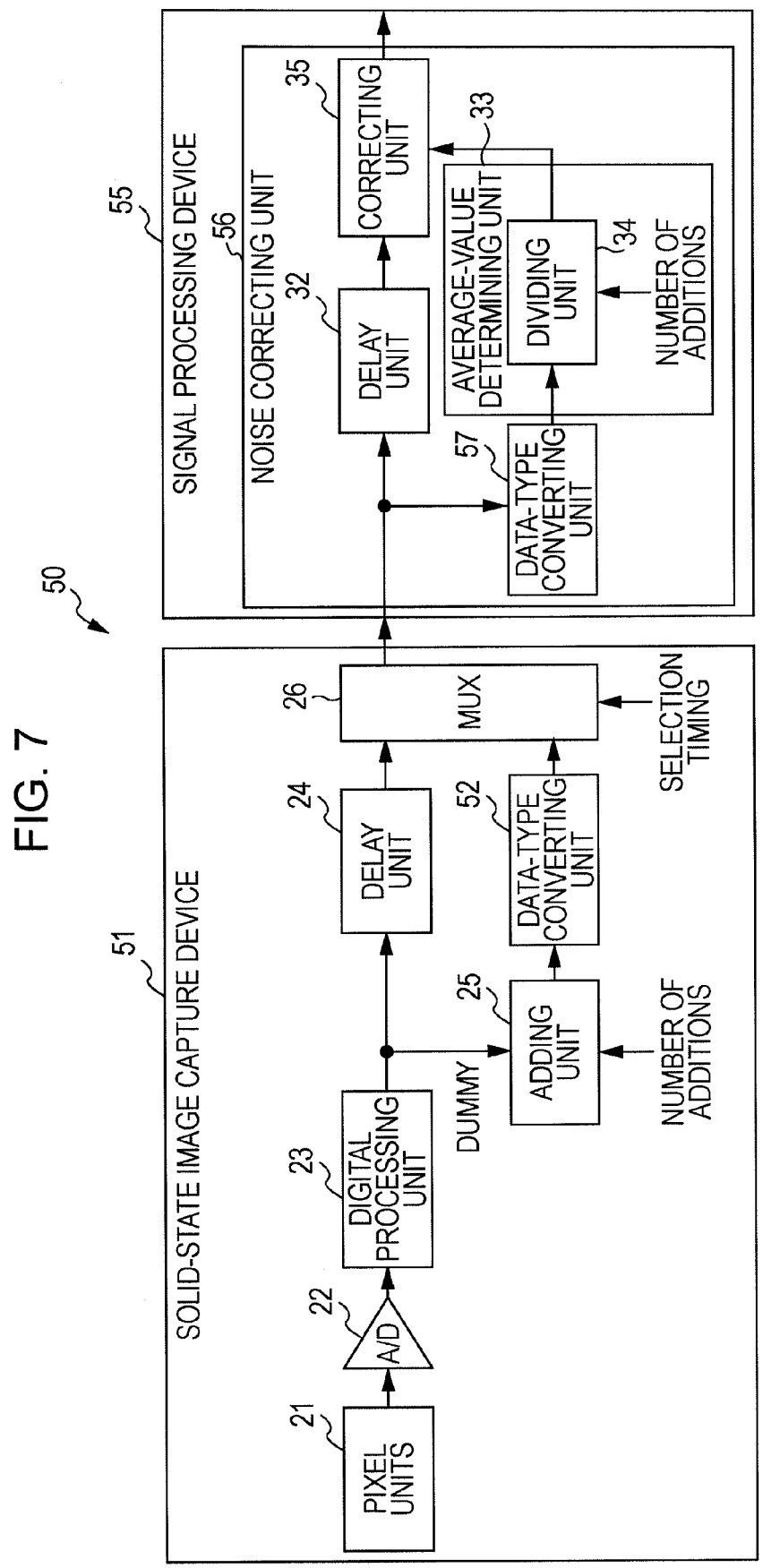
FIG. 7 is a block diagram showing an example of the internal configuration of an image capture apparatus according to a second embodiment of the present invention.

FIG. 7 is a block diagram showing an example of the internal configuration of the image capture apparatus 50.

The image capture apparatus 50 includes the solid-state image capture device 51 and the signal processing device 55. The solid-state image capture device 51 outputs digital image signals and the signal processing device 55 performs predetermined correction processing on the digital image signals.

The solid-state image capture device 51 includes pixel units 21, an analog-to-digital (A/D) converting unit 22, a digital processing unit 23, a delay unit 24, an adding unit 25, a data-type converting unit 52, and a multiplexer (MUX) 26.

The data-type converting unit 52 included in the solid-state image capture device 51 converts the data type of the pixel data. More specifically, the data-type converting unit 52 converts the data type of the third-digital-signal-containing pixel data by dividing the third digital signals, added by the adding unit 25, into a most significant bit (MSB) and a least significant bit (LSB), and outputs the pixel data having the converted data type to the multiplexer 26. In this case, the data-type converting unit 52 first transfers the MSB of the pixel data to the signal processing device 55. The reason why the data type is converted in such a manner is to maintain the word length of the added data.

The word length of the added data obtained by addition of the pixel data having a word length of 12 bits can be expressed in the following manner. In this case, addition of the pixel data containing image signals output from n pixels is simply referred to as "n-pixel addition".

For Two-Pixel Addition: 13 Bits
For Four-Pixel Addition: 14 Bits
For Eight-Pixel Addition: 15 Bits
For 16-Pixel Addition: 16 Bits
For 32-Pixel Addition: 17 Bits
For 64-Pixel Addition: 18 Bits In order to transfer the added data with a width of 12 bits, it is generally necessary to divide the added data. Thus, the solid-state image capture device 51 in the present embodiment divides the added data into the MSB and the LSB. For example, added data having a word length of 12 bits is divided into 6 bits and 6 bits, added data having a word length of 13 bits is divided into 1 bit and 12 bits, and added data having a word length of 14 bits is divided into 2 bits and 12 bits.

More specifically, in this case, with respect to the added data having a word length of 13 bits, 11 bits and 1 bit in the first word are used as invalid data and valid data (MSB), respectively, and 12 bits in the second word are used as valid data (LSB).

Although the data-type converting unit 52 first transfers the MSB to the signal processing device 55, it may first transfer the LSB if the bit assignments at the transmitting end the receiving end are the same.

The data length of the pixel data containing the image signals output from the dummy pixel area 43 in the present embodiment is expressed by two words obtained by adding the pixel data at each of the upper, lower, left, and right sides. In this case, one word corresponds to MSB/LSB of pixels added. The MSB is a highest-order bit of a data string represented in binary form and the LSB is a lowest-order bit thereof. After adding the pixel data containing the digital image signals obtained from the dummy pixel area 43, the solid-state image capture device 2 in the present embodiment outputs pixel data containing two-word digital image signals.

The signal processing device 55 has a noise correcting unit 56 for correcting noise of the digital image signals. The noise correcting unit 56 includes a delay unit 32, a correcting unit 35, a data-type converting unit 57, and an average-value determining unit 33. The average-value determining unit 33 has a dividing unit 34.

The data-type converting unit 57 connects the bits of the added third-digital-signal-containing pixel data received from the solid-state image capture device 2 and outputs bit-connected third-digital-signal-containing pixel data to the average-value determining unit 33. The average-value determining unit 33 uses the bit-connected pixel data to determine an average value of the signal levels. Thus, when the signal processing device 55 performs noise correction on the digital image signals, the average-value determining unit 33 can quickly determine the average value of the digital image signals.

Figure 8:
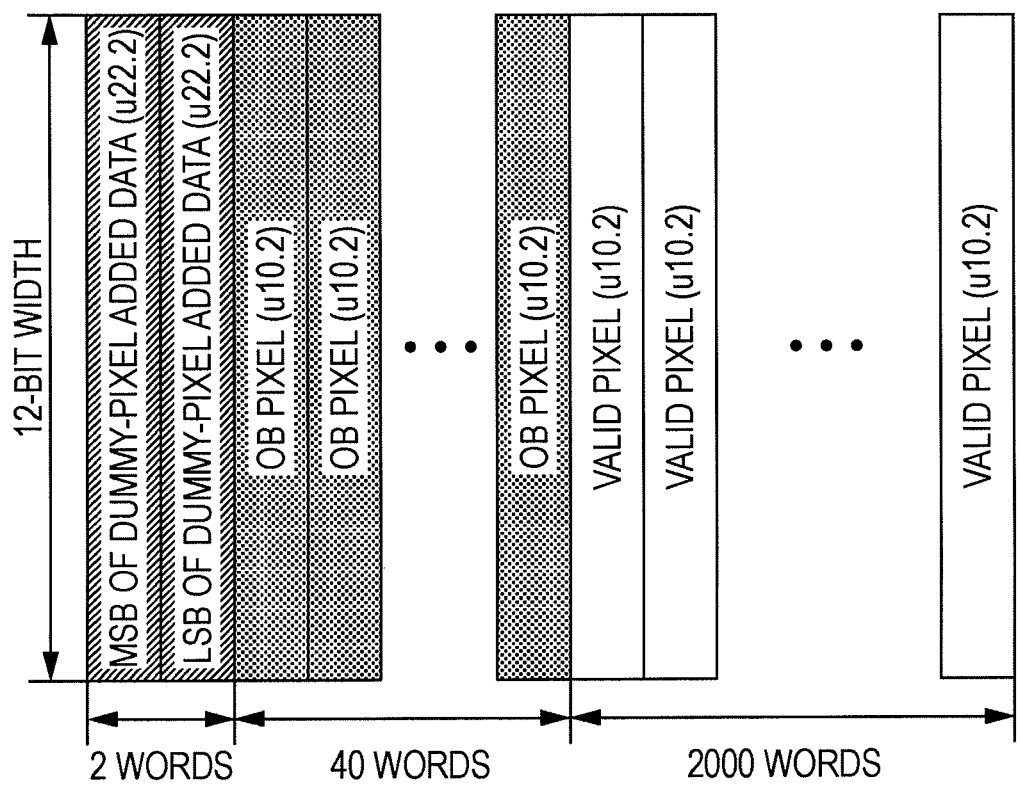
FIG. 8 illustrates an example of a scheme for transferring, in a horizontal line, pixel data output from the solid-state image capture device in the second embodiment of the present invention.

FIG. 8 illustrates an example of a scheme for transferring pixel data in one horizontal line 45.

The horizontal line 45 for the image signals output from the solid-state image capture device 51 to the signal processing device 55 has a structure as described below. The horizontal line 45 in this example includes added data obtained from the pixel data output from the two-word dummy pixel area 43, the pixel data output from the 40-word OB pixel area 42, and the pixel data output from the 2000-word valid pixel area 41. In the illustration in FIG. 8, however, attention is given to only the area 44 described above. In practice, the horizontal line 45 further includes the pixel data output from the 40-word OB pixel area 42 and the added data obtained from the pixel data output from the two-word dummy pixel area 43, the 40-word OB pixel area 42 and the two-word dummy pixel area 43 being located at the right side of the valid pixel area 41.

The MSB or LSB of the added data obtained by adding the pixel data output from the dummy pixels in this example is expressed by u22.2 for each pixel. The pixel data of each of the 40-word OB pixels and the pixel data of the 2000-word valid pixels is expressed by u10.2. More particularly, since the pixel data containing the image signals output from 40 pixels are added, u16.2 is divided into an MSB and an LSB and two words are output at a time. In this case, u22.2 is a largest word length at which data of a word length of 12 bits can be obtained with two words, such a large word length is not generally necessary for a case in which the pixel data containing the image signals output from 40 pixels are merely added.

The image capture apparatus 50 of the second embodiment described above is configured such that the data type of the pixel data is converted after the solid-state image capture device 51 adds the pixel data. Consequently, the accuracy of correcting the digital image signals can be increased, thus offering an advantage in that a high-quality image is provided. In addition, since the solid-state image capture device 51 outputs the pixel data having the converted data type to the signal processing device 55, the image capture apparatus 50 has an advantage in that the overall computation speed for the noise correction can be increased.

Third Embodiment

Example in which Pixel Data Having Average Value of Dummy Pixels is Transferred

A third embodiment according to the present invention will be described next.

The third embodiment is directed to an image capture apparatus 60 in which a solid-state image capture device 61 converts the data type of the digital image signals and then outputs digital image signals having the converted data type to a signal processing device 65. In the description below, units corresponding to those described above in the first embodiment and illustrated in FIGS. 1 and 3 are denoted by the same reference numerals and detailed descriptions thereof are not given hereinafter.

Figure 9:
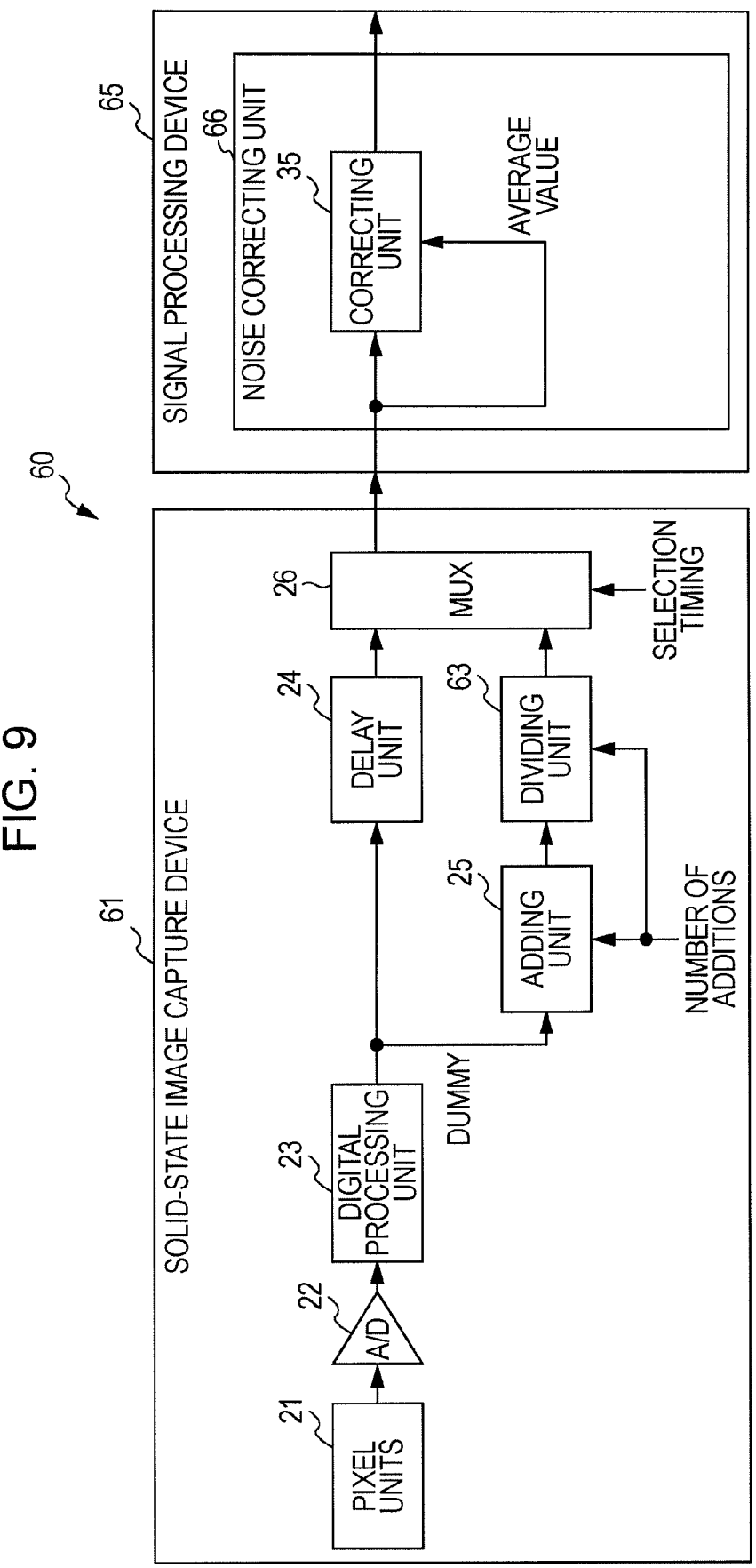
FIG. 9 is a block diagram showing an example of the internal configuration of an image capture apparatus according to a third embodiment of the present invention.

FIG. 9 is a block diagram showing an example of the internal configuration of the image capture apparatus 60.

The image capture apparatus 60 includes the solid-state image capture device 61 and the signal processing device 65. The solid-state image capture device 61 outputs digital image signals and the signal processing device 65 receives the digital image signals and performs predetermined correction processing on the digital image signals.

The solid-state image capture device 61 includes pixel units 21, an analog-to-digital (A/D) converting unit 22, a digital processing unit 23, a delay unit 24, an adding unit 25, a dividing unit 63, and a multiplexer (MUX) 26.

The signal processing device 65 has a noise correcting unit 66 for correcting noise of the digital image signals. The noise correcting unit 66 has a correcting unit 35.

The dividing unit 63 included in the solid-state image capture device 61 in the present embodiment corrects a failure in the pixel data.

The digital processing unit 23 outputs pixel data containing the third digital signals, the pixel data being output from the dummy pixel area 43, to the adding unit 25. Parameters, such as the number of additions, are input to the adding unit 25 and the dividing unit 63. The dividing unit 63 divides the third-digital-signal-containing pixel data, added by the adding unit 25, by the number of additions input as the parameter, to determine an average value of the levels of the third digital signals included in the added pixel data. The dividing unit 63 then outputs pixel data having the average value to the multiplexer 26. The multiplexer 26 selects the delayed first-to-third-digital-signal-containing pixel data processed by the digital processing unit 23 or the pixel data having the average value determined by the dividing unit 63 and outputs the selected pixel data. The correcting unit 35 corrects the level of the first-to-third-digital-signal-containing pixel data by subtracting the average value from the first-to-third-digital-signal-containing pixel data received from the solid-state image capture device 61.

Thus, in the solid-state image capture device 61 in the present embodiment, the adding unit 25 adds the image signals output from the dummy pixel area 43 and the dividing unit 63 determines the average value of the signal levels, to thereby prevent mixing of pixel data of a defective pixel. As described above, the average value obtained from the dummy pixel area 43 is transferred and the digital image signals obtained for each pixel from the OB pixel area 42 are transferred. The reasons of such an arrangement are to obtain pixel data having the average value without failure correction, since no failure occurs in the dummy pixel area 43, and to determine the average value of added pixel data containing the image signals output from the OB pixel area 42 in which a failure may occur.

Figure 10:
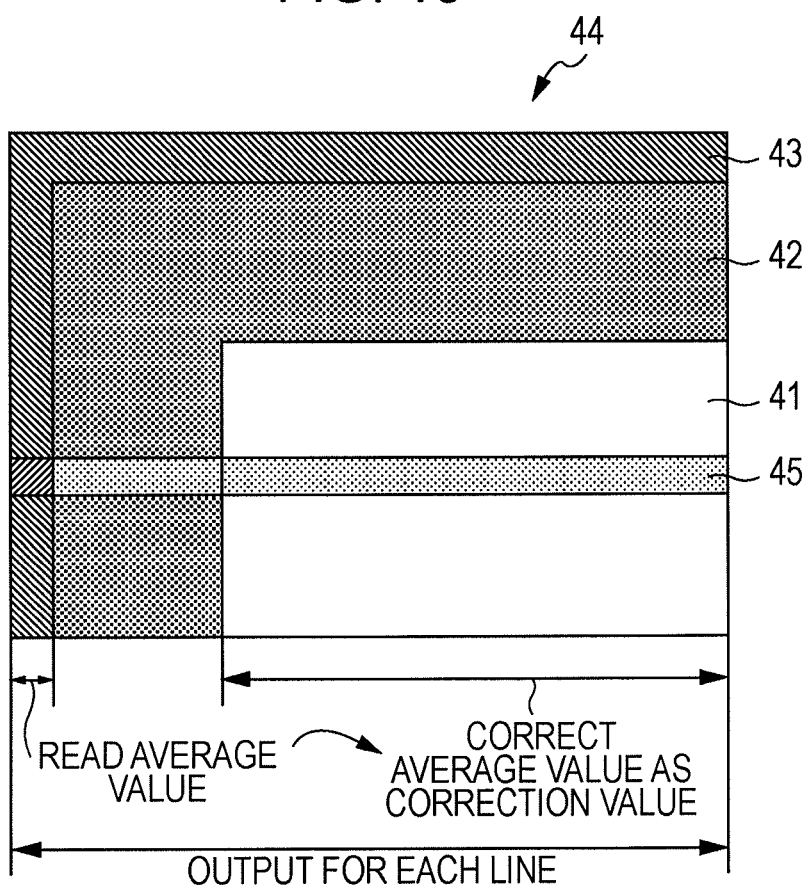
FIG. 10 is a diagram illustrating an example of noise detection of pixel data and correction processing of digital image signals, the noise detection and the correction processing being performed by the image capture apparatus according to the third embodiment of the present invention.

FIG. 10 illustrates an example of noise detection and correction processing on the pixel data, the noise detection and the correction processing being performed by the solid-state image capture device 61 in the present embodiment.

A horizontal line 45 includes image signals output from the valid pixel area 41, the OB pixel area 42, and the dummy pixel area 43.

The solid-state image capture device 61 outputs the average value of the signal levels of the digital image signals obtained from the dummy pixel area 43. The correcting unit 35 uses the average value as a correction value to perform noise correction on the digital image signals obtained from the valid pixel area 41.

Figure 11:
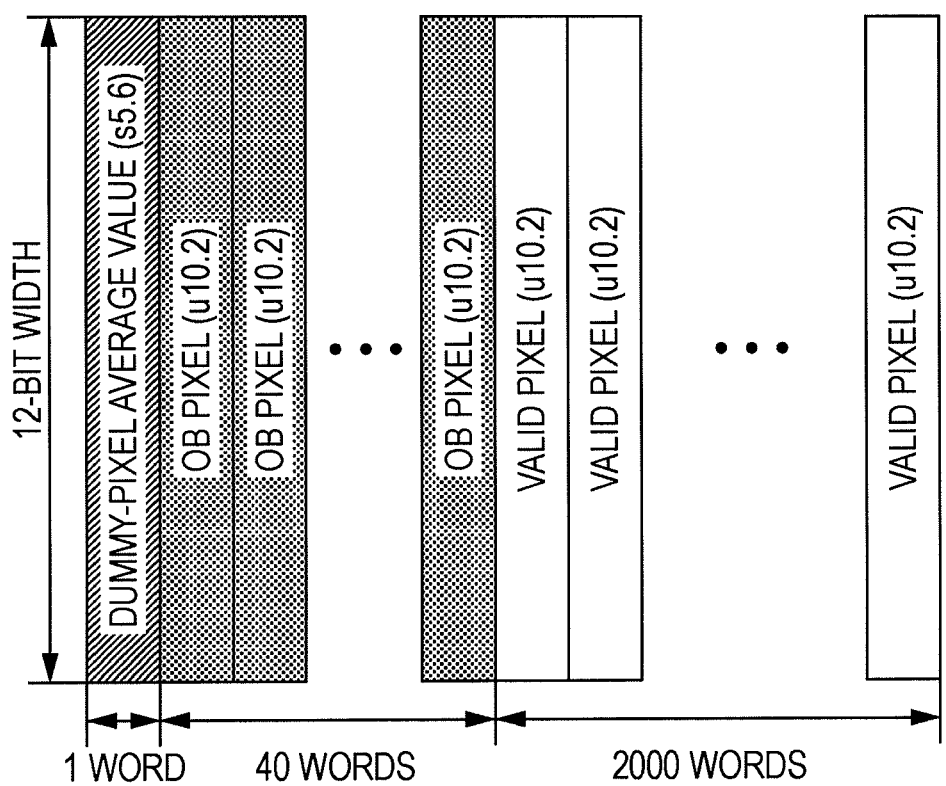
FIG. 11 illustrates an example of a scheme for transferring, in a horizontal line, pixel data output from the solid-state image capture device in the third embodiment of the present invention.

FIG. 11 illustrates an example of a scheme for transferring pixel data in one horizontal line 45.

The transfer scheme of the pixel data is analogous to the example (see FIG. 5) of the transfer scheme of the pixel data in the first embodiment described above. The solid-state image capture device 61 performs correction, which is generally performed by the signal processing device 3 in the case of the related art, on the image signals output from a pixel having a pixel failure.

The horizontal line 45 for the image signals output from the solid-state image capture device 61 to the signal processing device 65 has a structure as described below. The horizontal line 45 includes the average-value data obtained from the pixel data output from the one-word dummy pixel area 43, the pixel data output from the 40-word OB pixel area 42, and the pixel data output from the 2000-word valid pixel area 41. In practice, the horizontal line 45 further includes the pixel data output from the 40-word OB pixel area 42 and the average-value data obtained from the pixel data output from the one-word dummy pixel area 43, the 40-word OB pixel area 42 and the one-word dummy pixel area 43 being located at the right side of the valid pixel area 41.

In the present embodiment, the format of pixel data for each pixel, the pixel data being output from the dummy pixel area 43, is expressed by s5.6 for each pixel. Thus, the bit word length of the average value can be output after being adjusted to the bit word length of the pixel data output from one pixel included in the valid pixel area 41, with a decimal point accuracy used for signal processing and in accordance with a singed bit word length, while preventing deterioration of the accuracy caused by truncation, rounding, and so on. In this case, in the representation "s5.6", "s" means "signed" and "5.6" means that the integer portion is 5 bits and the fractional portion is 6 bits.

In the image capture apparatus 60 according to the third embodiment described above, after converting the image signals output from the dummy pixel area 43 into the digital image signals, the solid-state image capture device 61 performs failure correction thereon and then outputs the average value of determined signal levels. The noise correcting unit 66 uses the average value as a correction value to perform noise correction on the digital image signals. This arrangement makes it possible to reduce the transfer time of the pixel data from the solid-state image capture device 61 to the signal processing device 65 and also makes it possible to reduce the processing load of the signal processing device 65. Accordingly, there are advantages in that the overall processing speed of the image capture apparatus 60 increases and the power consumption decreases.

Figure 12:
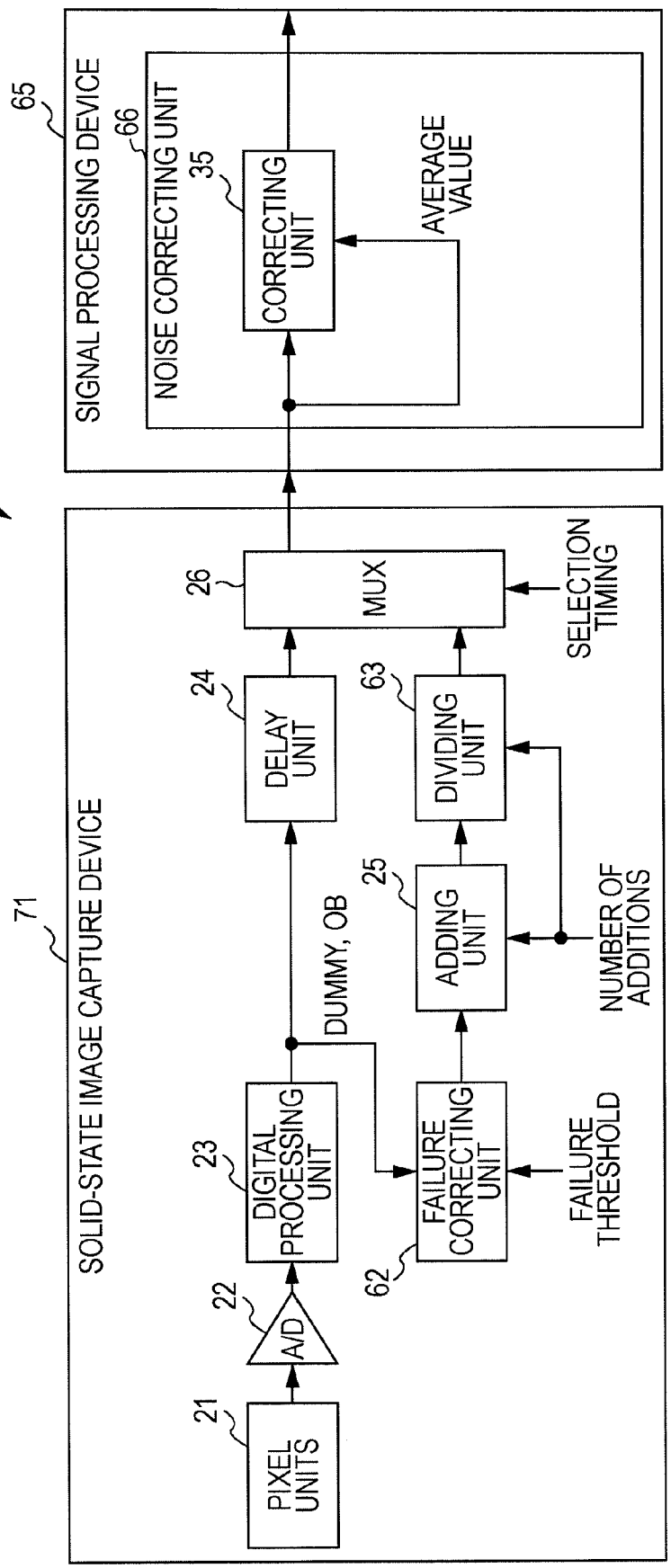
FIG. 12 is a block diagram showing another example of the internal configuration of the image capture apparatus according to the third embodiment of the present invention.

FIG. 12 shows an example of an image capture apparatus 70 according to an example of the image capture apparatus 60 according to the third embodiment illustrated in FIG. 9.

An image capture apparatus 70 according to this example includes a solid-state image capture device 71 and a signal processing device 65. In the solid-state image capture device 71, a digital processing unit 23 outputs the digital-processed second and third digital signals to a failure correcting unit 62. A failure threshold is input to the failure correcting unit 62 as a parameter. Upon determining that a failure in the pixel data containing the second and third digital signals processed by the digital processing unit 23 is not in the range of the failure threshold, the failure correcting unit 62 corrects the failure in the pixel data so that it falls within the range of the failure threshold. The failure correcting unit 62 then outputs pixel data containing the failure-corrected second and third digital signals to the adding unit 25.

The adding unit 25 adds the pixel data containing the failure-corrected second and third digital signals a predetermined number of times. The dividing unit 63 determines an average value of the signal levels by dividing the added pixel data by the predetermined number of additions and outputs pixel data having the average value to the multiplexer 26.

Thus, according to the solid-state image capture device 71 in this example, the failure correcting unit 62 corrects a failure in the second and third digital signals and then the adding unit 25 adds the second and third digital signals, to thereby reduce an influence of the image signals output from a pixel having a pixel failure.

Figure 13:
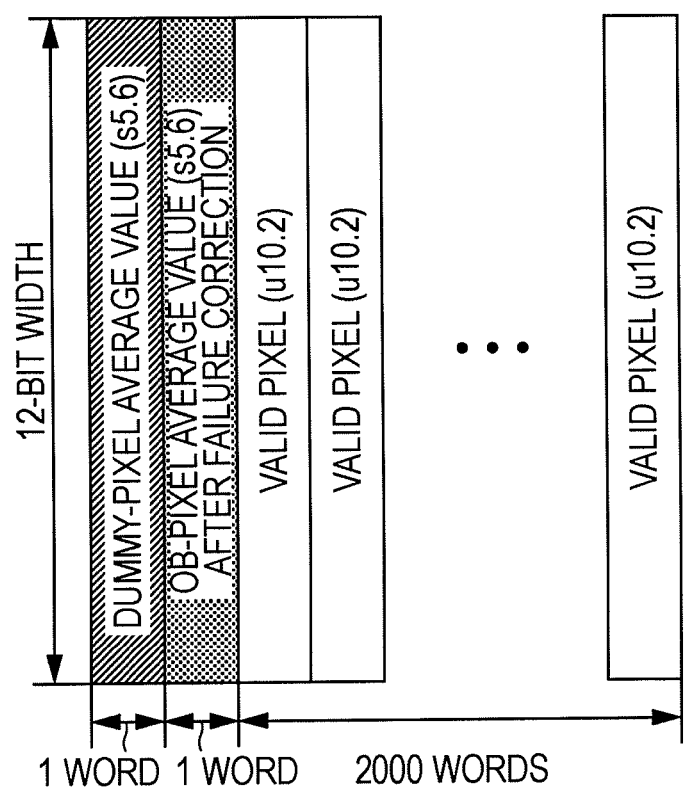
FIG. 13 illustrates an example of a scheme for transferring, in a horizontal line, pixel data output from another example of the solid-state image capture device in the third embodiment of the present invention.

FIG. 13 illustrates an example of a scheme for transferring pixel data in one horizontal line 45.

The horizontal line 45 for the image signals output from the solid-state image capture device 71 to the signal processing device 65 has a structure as described below. The horizontal line 45 includes one-word average-value data obtained from the pixel data output from the dummy pixel area 43 and one-word failure-corrected average-value data obtained from the pixel data output from the one-word OB pixel area 42. The horizontal line 45 further includes the pixel data output from the 2000-word valid pixel area 41. In practice, the horizontal line 45 further includes one-word failure-corrected average-value data obtained from the pixel data output from the OB pixel area 42 and one-word average-value obtained from the pixel data output from the dummy pixel area 43, the OB pixel area 42 and the dummy pixel area 43 being located at the right side of the valid pixel area 41. The added data of the dummy pixels is expressed by s5.6 for each pixel. The pixel data of the 2000-word valid pixels are expressed by u10.2 for each pixel.

With this arrangement, the solid-state image capture device 71 performs addition and division after correcting a pixel failure in the pixel data containing the digital image signals obtained from the OB pixel area 42 and outputs the average value of the signal levels of the digital image signals obtained from the OB pixel area 42. The solid-state image capture device 71 performs addition and division on the pixel data containing the digital image signals obtained from the dummy pixel area 43 and outputs the average value of the signal levels of the digital image signals obtained from the dummy pixel area 43. In this case, the solid-state image capture device 71 adjusts the bit word length of the average value to the bit word length of the pixel data output from one pixel included in the valid pixel area 41, with the decimal point accuracy used by the signal processing device 65 and in accordance with a signed bit word length, and outputs the resulting pixel data.

According to the image capture apparatus 70 of the above-described example, average values of the dummy pixels and the OB pixels after failure correction are determined with respect to the pixel data output from the solid-state image capture device 71. Thus, there is an advantage in that it is possible to prevent information deterioration due to truncation or rounding of fractions included in the pixel data.

Fourth Embodiment

Example in which Pixel Data Having Average Value of Dummy Pixels and Failure-Corrected Average Value of OB Pixels are Transferred A fourth embodiment according to the present invention will be described next.

The fourth embodiment is directed to an image capture apparatus 80 in which a solid-state image capture device 81 converts the data type of the pixel data and then outputs pixel data having the converted data type to a signal processing device 85. In the description below, units corresponding to those described above in the first embodiment and illustrated in FIG. 1 are denoted by the same reference numerals and detailed descriptions thereof are not given hereinafter.

Figure 14:
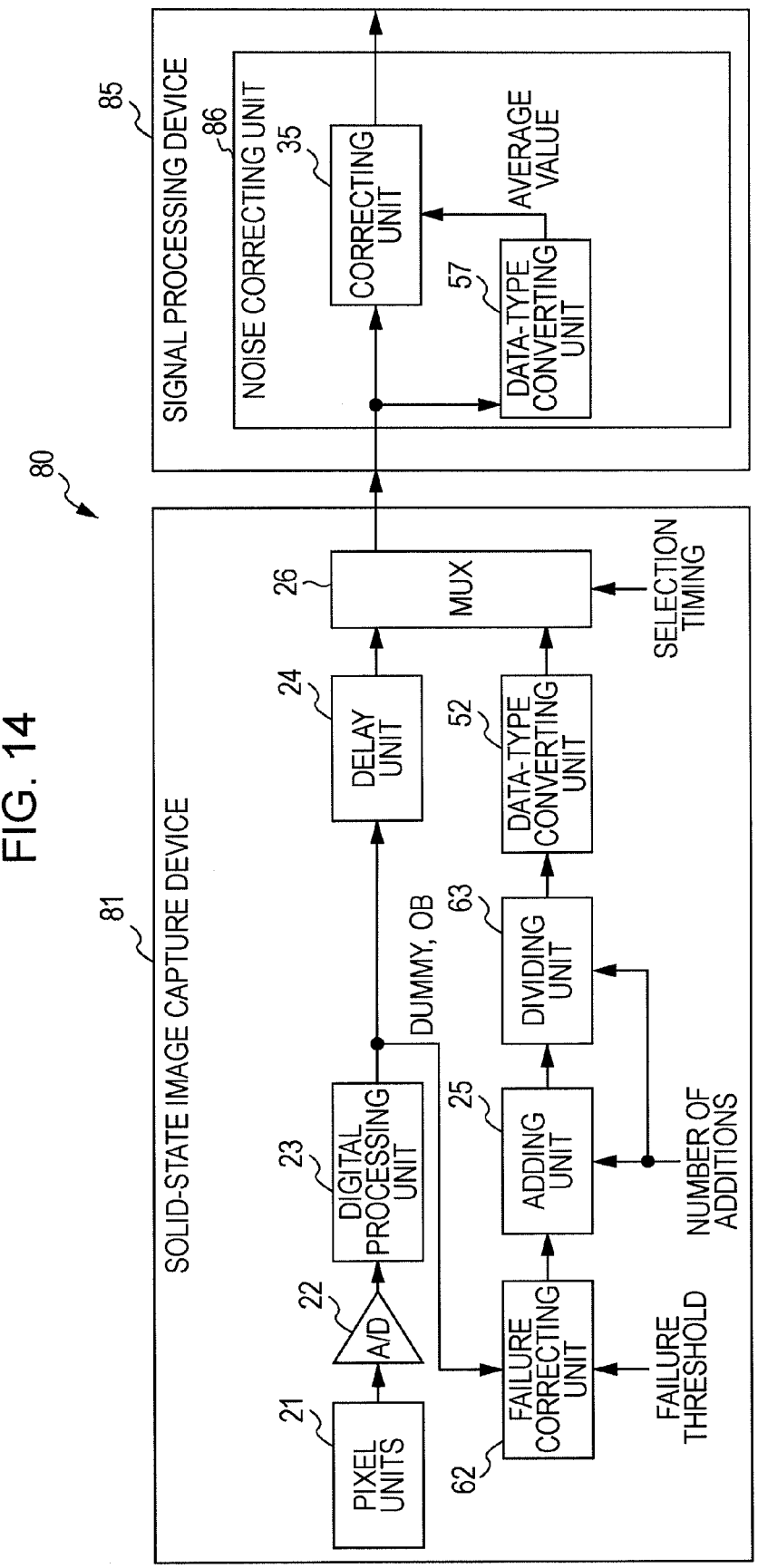
FIG. 14 is a block diagram showing an example of the internal configuration of an image capture apparatus according to a fourth embodiment of the present invention.

FIG. 14 is a block diagram showing an example of the internal configuration of the image capture apparatus 80 according to the present embodiment.

The image capture apparatus 80 includes the solid-state image capture device 81 and the signal processing device 85. The solid-state image capture device 81 outputs digital image signals and the signal processing device 85 performs predetermined correction processing on the digital image signals.

The solid-state image capture device 81 includes pixel units 21, an analog-to-digital (A/D) converting unit 22, a digital processing unit 23, a delay unit 24, a failure correcting unit 62, an adding unit 25, a dividing unit 63, a data-type converting unit 52, and a multiplexer (MUX) 26.

The signal processing device 85 has a noise correcting unit 86 for correcting noise of the digital image signals. The noise correcting unit 86 has a data-type converting unit 57 and a correcting unit 35.

In addition to the internal blocks of the solid-state image capture device 71 described above with reference to FIG. 12, the solid-state image capture device 81 in the present embodiment further includes the data-type converting unit 52, which serves as a first data-type converting unit, for converting the data type of the pixel data.

The data-type converting unit 52 converts the data type of the pixel data having the average value processed by the dividing unit 63 into a floating-point format and outputs the average-value pixel data having the converted data type to the multiplexer 26.

With respect to the data type of the pixel data in the present embodiment, one-word average-value data of the dummy pixels and one-word failure-corrected average-value data of the OB pixels are each expressed by a floating point. The data-type converting unit 52 adjusts the average-value data to have the bit word length of the pixel data output from one pixel included in the valid pixel area 41, by converting the average-value data into the floating-point format, and then outputs the adjusted average-value data to the multiplexer 26. Thereafter, the solid-state image capture device 81 transfers the average-value data to the signal processing device 85 in conjunction with the pixel data containing the digital image signals obtained from the valid pixels. The data-type converting unit 57, which servers as a second data-type converting unit, performs inverse conversion on the data type of the average value received from the solid-state image capture device 81. The correcting unit 35 corrects the level of the first-to-third-digital-signal-containing pixel data received from the solid-state image capture device 81 by subtracting the average value, received from the data-type converting unit 57, from the first-to-third-digital-signal-containing pixel data.

Figure 15:
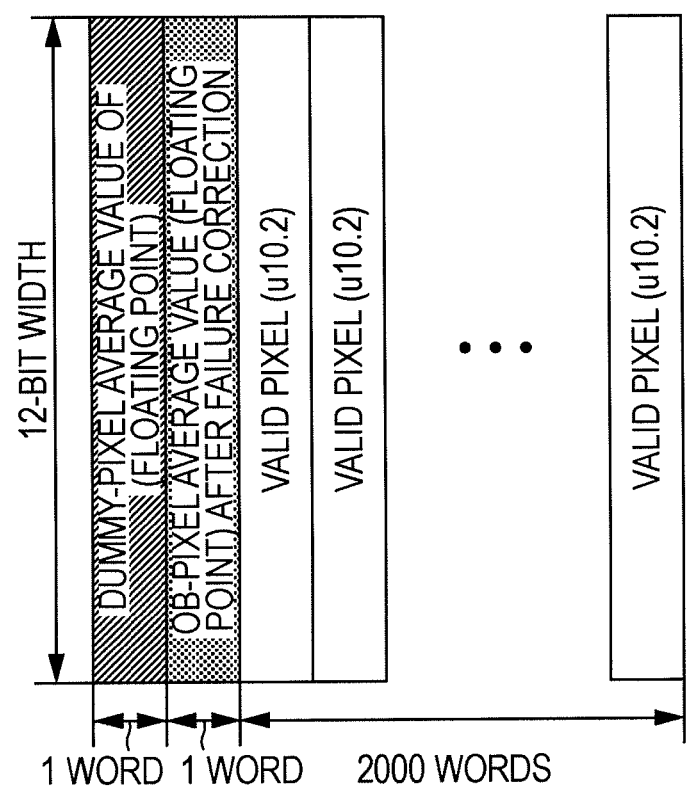
FIG. 15 illustrates an example of a scheme for transferring, in a horizontal line, pixel data output from the solid-state image capture device in the fourth embodiment of the present invention.
Figure 16:
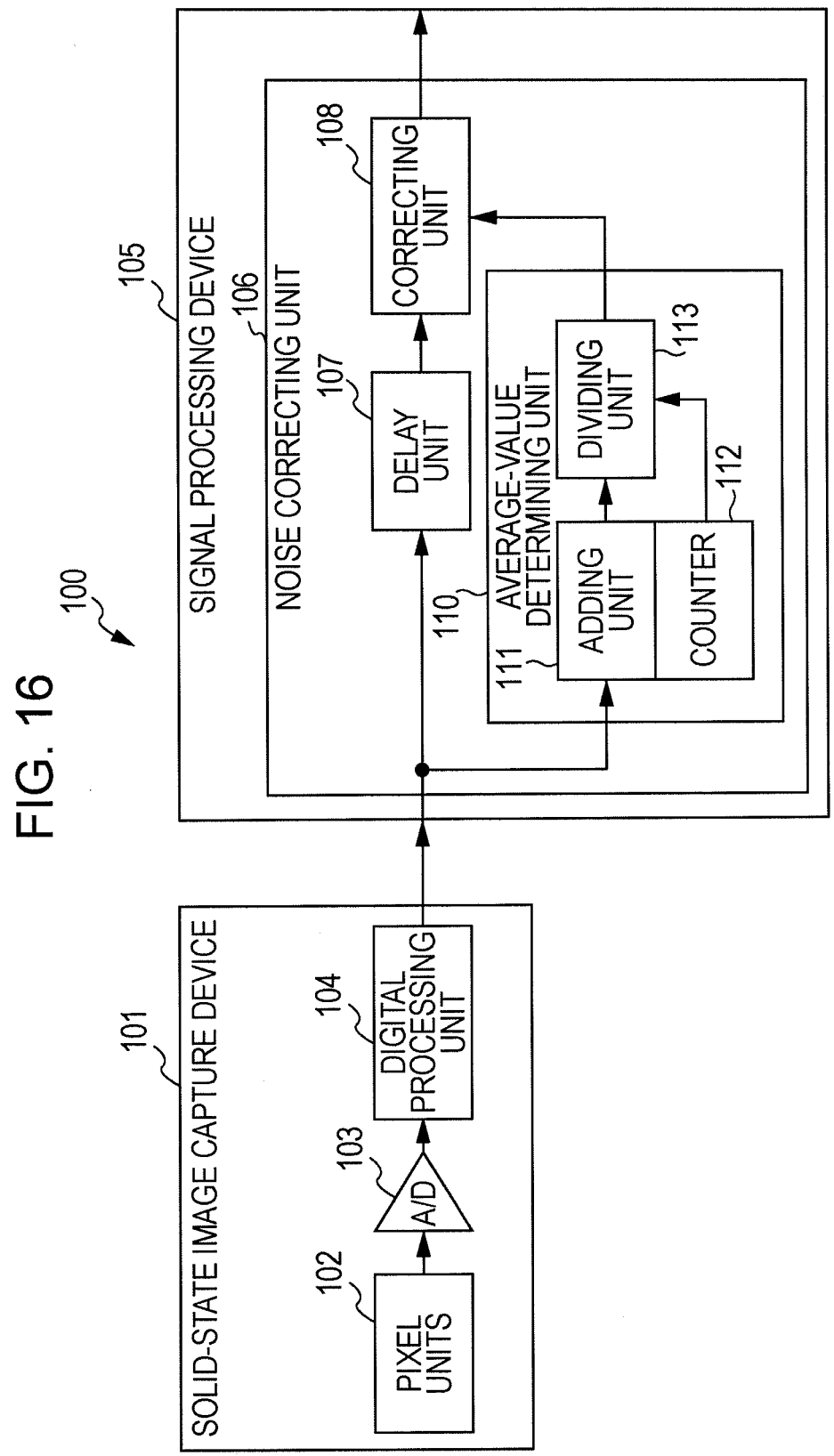
FIG. 16 is a block diagram showing an example of the internal configuration of an image capture apparatus of related art.

FIG. 15 illustrates an example of a scheme for transferring pixel data in one horizontal line 45.

The horizontal line 45 for the image signals output from the solid-state image capture device 81 to the signal processing device 85 has a structure as described below. The horizontal line 45 includes one-word average-value data obtained from the pixel data output from the dummy pixel area 43 and one-word failure-corrected average-value data obtained from the pixel data output from the OB pixel area 42. The horizontal line 45 further includes the pixel data output from the 2000-word valid pixel area 41. In practice, the horizontal line 45 further includes one-word failure-corrected average-value data obtained from the pixel data output from the OB pixel area 42 and one-word average-value data obtained from pixel data output from the dummy pixel area 4, the OB pixel area 42 and the dummy pixel area 43 being located at the right side of the valid pixel area 41.

According to the image capture apparatus 80 according to the fourth embodiment described above, the solid-state image capture device 81 converts the analog image signals, output from the OB pixel area 42, into the digital image signals. Thereafter, the solid-state image capture device 81 performs failure correction on the signal levels of the digital image signals and then determines an average value of the signal levels. The solid-state image capture device 81 performs summation and division on the pixel data containing the digital image signals obtained from the dummy pixel area 43 and outputs the average value of the signal levels of the digital image signals obtained from the dummy pixel area 43. The solid-state image capture device 81 expresses, in floating-point formats, the average-value data of the digital image signals output from the dummy pixel area 43 and the average-value data of the failure-corrected digital image signals output from the OB pixel area 42 and then outputs the average-value data expressed in the floating-point formats to the signal processing device 85. The noise correcting unit 86 uses the average value as a correction value to perform noise correction on the digital image signals. The fourth embodiment further offers advantages in that the transfer time of the pixel data from the solid-state image capture device 81 to the signal processing device 85 can be reduced and the load of the signal processing device 85 can be reduced.

Modification

The series of processing on the digital signals output from the solid-state image capture device in each of the first to fourth embodiments described above can be executed by hardware or software. When the series of processing is to be executed by software, various functions can be executed by installing a program that implements the software or various programs onto a computer incorporated into dedicated hardware. For example, a program that implements desired software may be installed on a general-purpose personal computer or the like for execution.

A storage medium on which software program code for realizing the functions of the above-described embodiments is recorded may be supplied to a system, an apparatus, or a device. Needless to say, the functions are realized when a computer (or a control device, such as a CPU (central processing unit)) for the system, the apparatus, or the device reads and executes the program code stored on the storage medium.

Examples of the storage medium for supplying the program code include a floppy disk, a hard disk, an optical disk, a magneto-optical disk, a CD-ROM, a CD-R, a magnetic tape, a nonvolatile memory card, and a ROM.

The functions of the above-described embodiments are realized by the computer executing the read program code. In addition, an OS (operating system) or the like running on the computer performs part or all of actual processing in accordance with instructions of the program code. The present invention also encompasses a case in which the processing realizes the functions of any of the above-described embodiments.

The present application contains subject matter related to that disclosed in Japanese Priority Patent Application JP 2009-175710 filed in the Japan Patent Office on Jul. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image capture device comprising:
a digital processing unit that performs predetermined processing on pixel data containing first, second, and third digital signals obtained from pixel units having a valid pixel area for generating the first digital signals through photoelectrical conversion of incident image light, an optical black pixel area for generating the second digital signals, and a dummy pixel area for generating the third digital signals, the optical black pixel area being provided in a light shielding area around the valid pixel area and the dummy pixel area being provided around the optical black pixel area;
an adding unit that adds the second-and-third-digital-signal-containing pixel data or the third-digital-signal-containing pixel data, processed by the digital processing unit, a predetermined number of times;
a dividing unit that divides the pixel data, added by the adding unit, by the predetermined number of times, to determine an average value of levels of the digital signals included in the added pixel data;
a delay unit that delays output of the first-to-third-digital-signal-containing pixel data, processed by the digital processing unit, by a predetermined amount of time; and a multiplexer that selects and outputs the first-to-third-digital-signal-containing pixel data processed by the digital processing unit or pixel data having the average value determined by the dividing unit.

2. The image capture device according to claim 1, wherein the multiplexer performs processing, on a field storing the third-digital-signal-containing pixel data included in the pixel data output from the pixel units to the digital processing unit, for substituting the second-and-third-digital-signal-containing pixel data or third-digital-signal-containing pixel data added by the adding unit and outputs resulting pixel data with a delay corresponding to the predetermined amount of time.

3. The image capture device according to claim 2, further comprising a failure correcting unit that corrects, when a failure in the second-and-third-digital-signal-containing pixel data processed by the digital processing unit is not in a range of a predetermined failure threshold, the failure in the second-and-third-digital-signal-containing pixel data so that the failure falls within the range of the failure threshold and that outputs the failure-corrected second-and-third-digital-signal-containing pixel data to the adding unit.

4. The image capture device according to claim 3, further comprising a data-type converting unit that converts a data type of the pixel data having the average value determined by the dividing unit into a floating-point format and that outputs the pixel data having the converted data type to the multiplexer.

5. An image capture apparatus comprising:
an image capture device including
a digital processing unit that performs predetermined processing on pixel data containing first, second, and third digital signals obtained from pixel units having a valid pixel area for generating the first digital signals through photoelectrical conversion of incident image light, an optical black pixel area for generating the second digital signals, and a dummy pixel area for generating the third digital signals, the optical black pixel area being provided in a light shielding area around the valid pixel area and the dummy pixel area being provided around the optical black pixel area,
an adding unit that adds the second-and-third-digital-signal-containing pixel data or the third-digital-signal-containing pixel data, processed by the digital processing unit, a predetermined number of times,
a first delay unit that delays output of the first-to-third-digital-signal-containing pixel data, processed by the digital processing unit, by a first amount of time, and
a multiplexer that selects and outputs the first-to-third-digital-signal-containing pixel data processed by the digital processing unit or the third-digital-signal-containing pixel data added by the adding unit; and
a signal processor including
a second delay unit that delays output of the first-to-third-digital-signal-containing pixel data, output from the image capture device, a second amount of time,
a dividing unit that divides signal levels of the added third-digital-signal-containing pixel data, output from the image capture device, by the predetermined number of times, to determine an average value of the levels of the third-digital-signal-containing pixel data, and
a correcting unit that corrects levels of the first-to-third-digital-signal-containing pixel data output from the second delay unit by subtracting the average value from the levels of the first-to-third-digital-signal-containing pixel data.

6. An image capture apparatus according to claim 5, wherein the multiplexer performs processing, on a field storing the third-digital-signal-containing pixel data included in the pixel data output from the pixel units to the digital processing unit, for substituting the second-and-third-digital-signal-containing pixel data or third-digital-signal-containing pixel data added by the adding unit and outputs resulting pixel data with a delay corresponding to the first amount of time.

7. The image capture apparatus according to claim 6, wherein the image capture device has a first data-type converting unit that converts a data type of the third-digital-signal-containing pixel data by dividing the third-digital-signal-containing pixel data, added by the adding unit, into a most significant bit and a least significant bit and that outputs the pixel data having the converted data type to the multiplexer; and
the signal processor includes a second data-type converting unit that connects bits of the added third-digital-signal-containing pixel data output from the image capture device and that outputs the bit-connected third-digital-signal-containing pixel data to the dividing unit.

8. An image capture apparatus comprising:
an image capture device including
a digital processing unit that performs predetermined processing on pixel data containing first, second, and third digital signals obtained from pixel units having a valid pixel area for generating the first digital signals through photoelectrical conversion of incident image light, an optical black pixel area for generating the second digital signals, and a dummy pixel area for generating the third digital signals, the optical black pixel area being provided in a light shielding area around the valid pixel area and the dummy pixel area being provided around the optical black pixel area,
an adding unit that adds the second-and-third-digital-signal-containing pixel data or the third-digital-signal-containing pixel data, processed by the digital processing unit, a predetermined number of times,
a dividing unit that divides the pixel data, added by the adding unit, by the predetermined number of times, to determine an average value of levels of the digital signals,
a delay unit that delays output of the first-to-third-digital-signal-containing pixel data, processed by the digital processing unit, by a predetermined amount of time, and
a multiplexer that selects and outputs the first-to-third-digital-signal-containing pixel data processed by the digital processing unit or pixel data having the average value determined by the dividing unit; and
a signal processor including a correcting unit that corrects the levels of the first-to-third-digital-signal-containing pixel data output from the image capture device by subtracting the average value, output from the image capture device, from the first-to-third-digital-signal-containing pixel data.

9. An image capture apparatus comprising:
an image capture device including
a digital processing unit that performs predetermined processing on pixel data containing first, second, and third digital signals obtained from pixel units having a valid pixel area for generating the first digital signals through photoelectrical conversion of incident image light, an optical black pixel area for generating the second digital signals, and a dummy pixel area for generating the third digital signals, the optical black pixel area being provided in a light shielding area around the valid pixel area and the dummy pixel area being provided around the optical black pixel area,
a failure correcting unit that corrects, when a failure in the second-and-third-digital-signal-containing pixel data processed by the digital processing unit is not in a range of a predetermined failure threshold, the failure in the second-and-third-digital-signal-containing pixel data so that the failure falls within the range of the failure threshold and that outputs the failure-corrected second-and-third-digital-signal-containing pixel data,
an adding unit that adds the second-and-third-digital-signal-containing pixel data, processed by the failure correcting unit, a predetermined number of times,
a dividing unit that divides the pixel data, added by the adding unit, by the predetermined number of times, to determine an average value of levels of the pixel data,
a first data-type converting unit that converts a data type of pixel data having the average value determined by the dividing unit into a floating-point format,
a delay unit that delays output of the first-to-third-digital-signal-containing pixel data, processed by the digital processing unit, by a predetermined amount of time, and
a multiplexer that selects and outputs the first-to-third-digital-signal-containing pixel data processed by the digital processing unit or the pixel data having the average value; and
a signal processor including
a second data-type converting nit that performs inverse conversion on the data type of the average value output from the image capture device, and
a correcting unit that corrects the levels of the first-to-third-digital-signal-containing pixel data output from the image capture device by subtracting the average value, output from the second data-type converting unit, from the pixel data of the first-to-third-digital-signal-containing pixel data.

10. An image capture apparatus comprising:
an image capture device including a digital processing unit that performs predetermined processing on pixel data containing first, second, and third digital signals obtained from pixel units having a valid pixel area for generating the first digital signals through photoelectrical conversion of incident image light, an optical black pixel area for generating the second digital signals, and a dummy pixel area for generating the third digital signals, the optical black pixel area being provided in a light shielding area around the valid pixel area and the dummy pixel area being provided around the optical black pixel area;
a preprocessor including
an adding unit that adds the second-and-third-digital-signal-containing pixel data or the third-digital-signal-containing pixel data, processed by the digital processing unit, a predetermined number of times,
a first delay unit that delays output of the first-to-third-digital-signal-containing pixel data, processed by the digital processing unit, by a first predetermined amount of time, and
a multiplexer that selects and outputs the first-to-third-digital-signal-containing pixel data processed by the digital processing unit or the third-digital-signal-containing pixel data added by the adding unit; and
a signal processor including
a second delay unit that delays output of the first-to-third-digital-signal-containing pixel data, output from the preprocessor, by a second predetermined amount of time,
a dividing unit that divides the added third-digital-signal-containing, pixel data, output from preprocessor, by the predetermined number of times, to determine an average value of levels of the third-digital-signal-containing pixel data, and
a correcting unit that corrects levels of the first-to-third-digital-signal-containing pixel data output from the second delay unit by subtracting the average value from the levels of the first-to-third-digital-signal-containing pixel data.

11. A signal processing method comprising the steps of:
performing predetermined processing on pixel data containing first, second, and third digital signals obtained from pixel units having a valid pixel area for generating the first digital signals through photoelectrical conversion of incident image light, an optical black pixel area for generating the second digital signals, and a dummy pixel area for generating the third digital signals, the optical black pixel area being provided in a light shielding area around the valid pixel area and the dummy pixel area being provided around the optical black pixel area;
adding the processed second-and-third-digital-signal-containing pixel data or third-digital-signal-containing pixel data a predetermined number of times;
dividing the added third-digital-signal-containing pixel data by the predetermined number of times to determine an average value and outputting pixel data having the average value;
delaying output of the processed first-to-third-digital-signal-containing pixel data by a predetermined amount of time; and
selecting and outputting the processed first-to-third-digital-signal-containing pixel data or pixel data having the average value.

12. A non-transitory storage medium storing a program that causes a computer to execute the steps of:
processing pixel data containing first, second, and third digital signals obtained from pixel units having a valid pixel area for generating the first digital signals through photoelectrical conversion of incident image light, an optical black pixel area for generating the second digital signals, and a dummy pixel area for generating the third digital signals, the optical black pixel area being provided in a light shielding area around the valid pixel area and the dummy pixel area being provided around the optical black pixel area;
adding the processed second-and-third-digital-signal-containing pixel data or third-digital-signal-containing pixel data a predetermined number of times;
dividing the added third-digital-signal-containing pixel data by the predetermined number of times to determine an average value and outputting pixel data having the average value;
delaying output of the processed first-to-third-digital-signal-containing pixel data by a predetermined amount of time; and
selecting and outputting the processed first-to-third-digital-signal-containing pixel data or pixel data having the average value.

* * * * *